United States Patent
Candee et al.

(10) Patent No.: US 9,922,351 B2
(45) Date of Patent: Mar. 20, 2018

(54) LOCATION-BASED ADAPTATION OF FINANCIAL MANAGEMENT SYSTEM

(71) Applicant: Intuit Inc., Mountain View, CA (US)

(72) Inventors: Taylor M. Candee, Kenosha, WI (US); Charles H. Taira, Chula Vista, CA (US); Thomas J. Rohlf, San Diego, CA (US); Megan E. Caywood, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 614 days.

(21) Appl. No.: 14/014,124

(22) Filed: Aug. 29, 2013

(65) Prior Publication Data

US 2015/0066805 A1    Mar. 5, 2015

(51) Int. Cl.
*G06Q 30/02* (2012.01)

(52) U.S. Cl.
CPC .............................. *G06Q 30/0282* (2013.01)

(58) Field of Classification Search
CPC ... H04L 51/32; H04L 51/20; G06F 17/30867; G06F 3/0484; G06F 17/28
See application file for complete search history.

(56) References Cited

U.S. PATENT DOCUMENTS

| 5,566,291 A * | 10/1996 | Boulton | G09B 5/065 434/118 |
| 5,819,249 A | 10/1998 | Dohanich et al. | |
| 6,018,730 A | 1/2000 | Nichols et al. | |
| 6,202,052 B1 | 3/2001 | Miller | |

(Continued)

FOREIGN PATENT DOCUMENTS

| WO | 03/038693 A2 | 5/2003 |
| WO | WO 03/038693 A2 | 5/2003 |
| WO | 20061026636 A2 | 3/2006 |

OTHER PUBLICATIONS

Sharma et al., "Method and System for Creating Tax Configuration Templates," U.S. Appl. No. 13/655,313, filed Oct. 18, 2012.

(Continued)

*Primary Examiner* — Laurie A Ries
*Assistant Examiner* — Brian Garmon
(74) *Attorney, Agent, or Firm* — Vista IP Law Group LLP

(57) ABSTRACT

Location-based adaptation of financial management system. Crowdsourced feedback regarding financial management system content is tagged with location data such as an IP address and/or geographic location data. Location-specific counters track feedback received from different locations and may involve different languages, dialects, phrases or other manners of expression associated with different countries, states or regions thereof. When pre-determined criteria is satisfied, e.g., a threshold number of counts associated with a particular location, associated location-based feedback is analyzed and identified feedback patterns are used to selectively modify previously presented financial management system content and adapt the financial management system is adapted to different locations by presenting first modified content based at least in part upon a first identified pattern to users at a first location and second modified content based at least in part upon a second identified pattern to users at a different, second location.

33 Claims, 17 Drawing Sheets

(56) References Cited

U.S. PATENT DOCUMENTS

| | | | |
|---|---|---|---|
| 6,253,193 B1 | 6/2001 | Ginter et al. | |
| 6,311,190 B1 | 10/2001 | Bayer et al. | |
| 6,772,146 B2* | 8/2004 | Khemlani | G06F 17/30873 705/35 |
| 7,110,952 B2 | 9/2006 | Kursh | |
| 7,225,199 B1 | 5/2007 | Green et al. | |
| 7,249,072 B1 | 7/2007 | Nearhood et al. | |
| 7,279,216 B2 | 10/2007 | Chen et al. | |
| 7,603,301 B1 | 10/2009 | Regan | |
| 7,636,742 B1 | 12/2009 | Olavarrieta et al. | |
| 7,693,760 B1 | 4/2010 | Fiteni et al. | |
| 7,752,210 B2* | 7/2010 | Riise | G06F 17/3087 707/755 |
| 7,761,484 B2 | 7/2010 | Christensen et al. | |
| 7,814,470 B2 | 10/2010 | Mamou et al. | |
| 7,853,444 B2 | 12/2010 | Wang et al. | |
| 7,860,763 B1 | 12/2010 | Quinn et al. | |
| 7,904,595 B2 | 3/2011 | Cheng et al. | |
| 7,930,167 B2 | 4/2011 | Young et al. | |
| 7,970,796 B1 | 6/2011 | Narayanan | |
| 8,082,193 B2 | 12/2011 | Seeley et al. | |
| 8,209,229 B1 | 6/2012 | Weiss et al. | |
| 8,296,720 B2 | 10/2012 | Coulthard et al. | |
| 8,402,047 B1 | 3/2013 | Mangini et al. | |
| 8,438,006 B2 | 5/2013 | Yang et al. | |
| 8,452,676 B1 | 5/2013 | Talan et al. | |
| 8,510,095 B2 | 8/2013 | Wang et al. | |
| 8,527,307 B2 | 9/2013 | Hamilton, II et al. | |
| 8,554,537 B2 | 10/2013 | Rai et al. | |
| 8,595,710 B2 | 11/2013 | Aldahleh et al. | |
| 8,799,379 B1* | 8/2014 | Liden | G06Q 10/107 709/206 |
| 8,886,552 B2* | 11/2014 | Finkelstein | G06Q 30/0203 705/7.29 |
| 2001/0042080 A1 | 11/2001 | Ross | |
| 2002/0138447 A1* | 9/2002 | Dutta | G06Q 20/108 705/70 |
| 2003/0040899 A1 | 2/2003 | Ogilvie | |
| 2003/0167197 A1 | 9/2003 | Shoemaker et al. | |
| 2003/0195741 A1 | 10/2003 | Mani | |
| 2003/0200079 A1 | 10/2003 | Sakai | |
| 2003/0204498 A1 | 10/2003 | Lehnert | |
| 2004/0019540 A1 | 1/2004 | William et al. | |
| 2004/0019541 A1 | 1/2004 | William et al. | |
| 2004/0053202 A1 | 3/2004 | Sterns et al. | |
| 2004/0167768 A1 | 8/2004 | Travieso et al. | |
| 2004/0172447 A1 | 9/2004 | Miller | |
| 2005/0043941 A1 | 2/2005 | Janakiraman et al. | |
| 2005/0102283 A1 | 5/2005 | Anderson et al. | |
| 2005/0177358 A1 | 8/2005 | Melomed et al. | |
| 2006/0040095 A1 | 2/2006 | Chen et al. | |
| 2006/0080082 A1 | 4/2006 | Ravindra et al. | |
| 2006/0112091 A1 | 5/2006 | Chapman et al. | |
| 2006/0117304 A1 | 6/2006 | Anastassopoulos et al. | |
| 2006/0155618 A1 | 7/2006 | Wyle | |
| 2006/0206310 A1 | 9/2006 | Ravikumar et al. | |
| 2007/0021982 A1 | 1/2007 | Sun | |
| 2007/0041370 A1 | 2/2007 | Cleveland | |
| 2007/0136156 A1 | 6/2007 | Seeley et al. | |
| 2007/0174108 A1 | 7/2007 | Monster | |
| 2008/0262920 A1 | 10/2008 | O'Neill et al. | |
| 2008/0288239 A1* | 11/2008 | Bailey | G06F 17/248 704/2 |
| 2009/0063128 A1 | 3/2009 | Seo et al. | |
| 2009/0094609 A1 | 4/2009 | Burukhin et al. | |
| 2009/0112683 A1 | 4/2009 | Hamilton et al. | |
| 2009/0193035 A1* | 7/2009 | Benayon | G06F 17/30569 |
| 2010/0030616 A1 | 2/2010 | Criner | |
| 2010/0042518 A1 | 2/2010 | Handa et al. | |
| 2010/0045460 A1 | 2/2010 | Caler et al. | |
| 2010/0058169 A1 | 3/2010 | Demant et al. | |
| 2010/0198579 A1 | 8/2010 | Cunnington et al. | |
| 2011/0022381 A1 | 1/2011 | Gao et al. | |
| 2011/0029420 A1 | 2/2011 | Bianco et al. | |
| 2011/0087481 A1 | 4/2011 | Yang et al. | |
| 2011/0191215 A1 | 8/2011 | Nadler et al. | |
| 2011/0191246 A1 | 8/2011 | Brandstetter et al. | |
| 2011/0197285 A1 | 8/2011 | Ginter et al. | |
| 2011/0264569 A1 | 10/2011 | Houseworth et al. | |
| 2012/0017146 A1 | 1/2012 | Travieso et al. | |
| 2012/0036078 A1 | 2/2012 | Dean et al. | |
| 2012/0060112 A1 | 3/2012 | Wilson et al. | |
| 2012/0123766 A1 | 5/2012 | Anisimovich et al. | |
| 2012/0191580 A1 | 7/2012 | Bhatt | |
| 2012/0239381 A1 | 9/2012 | Heidasch | |
| 2012/0278213 A1 | 11/2012 | Bristow et al. | |
| 2012/0330721 A1 | 12/2012 | Volpe et al. | |
| 2013/0124185 A1 | 5/2013 | Sarr et al. | |
| 2013/0151233 A1 | 6/2013 | Gande et al. | |
| 2013/0191199 A1 | 7/2013 | Anisimovich et al. | |
| 2014/0006004 A1 | 1/2014 | Gundepuneni et al. | |
| 2014/0022951 A1 | 1/2014 | Lemieux | |
| 2014/0052434 A1 | 2/2014 | Bank et al. | |
| 2014/0114822 A1 | 4/2014 | Sharma et al. | |
| 2014/0129209 A1 | 5/2014 | Saleme et al. | |
| 2014/0129398 A1 | 5/2014 | Naik et al. | |
| 2014/0358748 A1 | 12/2014 | Goyette et al. | |

OTHER PUBLICATIONS

Goyette et al., "A Content Based Payroll Compliance System," U.S. Appl. No. 13/906,202, filed May 2013. 30, 2013.

Naik et al., "Method and System for Providing a Payroll Preparation Platform with User contribution-Based Plug-Ins," U.S. Appl. No. 13/668,014, filed Nov. 2, 2012.

Intuit, "Turbo Tax/MacInTax for Business Streamlines Tax Preparation for Small Business Owners," Intuit Press Release, Jan. 6, 1999, 2 pages.

International Search Report dated May 19, 2014 in International Application No. PCT/US2013/057725 filed Aug. 30, 2013, Form ISA 220 and 210 (5 pages).

International Written Opinion dated May 19, 2014 in International Application No. PCT/US2013/057725 filed Aug. 30, 2013, Form ISA 237, (8 pages).

Sharma et al., "Method and System for Creating Tax Configuration Templates," U.S. Appl. No. 13/655,313, filed Oct. 18, 2012 (62 pages).

Goyette et al., "A Content Based Payroll Compliance System," U.S. Appl. No. 13/906,202, filed May 30, 2013 (76 pages).

Intuit "TurboTax/MacInTax for Business Streamlines Tax Preparation for Small Business Owners," Intuit Press Release, Jan. 6, 1999, 2 pages. http://web.intuit.com/about_intuit/press_releases/1999/01-06_1.html.

Naik et al. "Method and System for Providing a Payroll Preparation Platform with User Contribution-Based Plug-Ins," U.S. Appl. No. 13/668,014, filed Nov. 2, 2012 (77 pages).

Crowdsourcing as Human-Machine Translation, http://en.wikipedia.org/wiki/Crowdsourcing_as_Human-Machine_Translation, printed: Aug. 29, 2013 (4pages).

Crowdsourcing, http://en.wikipedia.org/wiki/Crowdsourcing, printed: Aug. 29, 2013 (18pages).

Accounting Software for Small Business—Intuit QuickBooks, http://quickbooks.intuit.com/, printed: Aug. 29, 2013 (5pages).

QuickBooks, http://en.wikipedia.org/wiki/QuickBooks, printed: Aug. 29, 2013 (1 page).

Press Releases, QuickBooks Online Goes Global, No Matter Where They Call Home—Small Business Can Work Smarter and Grow, http://about.intuit.com/about_intuit/press_room/press_release/articles/2012/QuickBooksOnlineGoesGlobal.html, printed: Aug. 29, 2013 (2pages).

Hernandez, Pedro, QuickBooks Online Crosses Borders, Goes Worldwide, http://www.smallbusinesscomputing.com/News/Software/quickbooks-online-crosses-borders-goes-worldwide.html, Published on: Sep. 18, 2012, printed Aug. 29, 2013 (2pages).

Hamady, Bruce, QuickBooks UN Edition Into on Vimeo, Loading Videos, http://vimeo.com/52042519, printed: Aug. 29, 2013 (3pages).

(56) References Cited

OTHER PUBLICATIONS

Non-Final Office dated Mar. 18, 2015 in U.S. Appl. No. 13/850,629, filed Mar. 26, 2013, Inventor: Vijayan Srinivasan (26pages).
Amendment dated Jun. 18, 2015 in U.S. Appl. No. 13/850,629, filed Mar. 26, 2013, Inventor: Vijayan Srinivasan (13pages).
Final Office dated Jul. 17, 2015 in U.S. Appl. No. 13/850,629, filed Mar. 26, 2013, Inventor: Vijayan Srinivasan (23pages).
Non-Final Office dated Jun. 30, 2015 in U.S. Appl. No. 14/073,648, filed Nov. 6, 2013, Inventor: Lance Saleme (41pages).
Amendment dated Sep. 30, 2015 in U.S. Appl. No. 14/073,648, filed Nov. 6, 2013, Inventor: Lance Saleme (13pages).
Final Office dated Jan. 15, 2016 in U.S. Appl. No. 14/073,648, filed Nov. 6, 2013, Inventor: Lance Saleme (22pages).
Non-Final Office dated Apr. 21, 2015 in U.S. Appl. No. 13/906,202, filed May 30, 2013, Inventor: Steve G. Goyette (29pages).
Amendment dated Jul. 21, 2015 in U.S. Appl. No. 13/906,202, filed May 30, 2013, Inventor: Steve G. Goyette (22pages).
Final Office dated Aug. 7, 2015 in U.S. Appl. No. 13/906,202, filed May 30, 013, Inventor: Steve G. Goyette (19pages)
Amendment dated Sep. 29, 2015 in U.S. Appl. No. 13/906,202, filed May 30, 2013, Inventor: Steve G. Goyette (28pages)
Advisory Action dated Oct. 8, 2015 in U.S. Appl. No. 13/906,202, filed May 30, 2013, Inventor: Steve G. Govette (3pages)
Response to Final Office Action dated Mar. 15, 2016 in U.S. Appl. No. 14/073,648, filed Nov. 6, 2013, Inventor: Saleme et al., (12pages).
Advisory Action including Interview Summary dated Apr. 11, 2016 in U.S. Appl. No. 14/073,648, filed Nov. 6, 2013, Inventor: Saleme et al., (5pages).
PCT International Preliminary Report on Patentability (Chapter I of the Patent Cooperation Treaty) for PCT/US2013/057725, Applicant: Intuit, Inc., Form PCT/IB/326 and 373, dated Mar. 10, 2016 (10pages).

\* cited by examiner

FMS Content  500

| FMS Screen 502a | Screen Segment 502b |
|---|---|
| Screen 1 | Segment 1 |
| Screen 1 | Segment 2 |
| Screen 2 | Segment 1 |
| Screen 2 | Segment 2 |
| ... | ... |

FIG. 5

Feedback Received Regarding FMS Content (Aggregator Processing) 800

| FMS Content 801a | Location Data 801b | Suggested Modification 801c | Count 801d |
|---|---|---|---|
| Screen 1 / Segment 1 | Location 1 | Segment 1-Mod1 | Count: 1 |
| Screen 1 / Segment 1 | Location 1 | Segment 1-Mod1 | Count: 2 |
| Screen 1 / Segment 1 | Location 1 | Segment 1-Mod1 | Count: 3 |
| Screen 1 / Segment 1 | Location 1 | Segment 1-Mod1 | Count: 4 |
| Screen 1 / Segment 1 | Location 1 | Segment 1-Mod1 | Count: 5 |
| Screen 1 / Segment 1 | Location 1 | Segment 1-Mod2 | Count: 1 |
| Screen 1 / Segment 1 | Location 2 | Segment 1-Mod2 | Count: 1 |
| Screen 1 / Segment 1 | Location 2 | Segment 1-Mod2 | Count: 2 |
| Screen 1 / Segment 1 | Location 2 | Segment 1-Mod2 | Count: 3 |
| Screen 1 / Segment 1 | Location 2 | Segment 1-Mod2 | Count: 4 |
| Screen 1 / Segment 1 | Location 2 | Segment 1-Mod2 | Count: 5 |
| Screen 1 / Segment 1 | Location 2 | Segment 1-Mod2 | Count: 6 |
| Screen 1 / Segment 1 | Location 2 | Segment 1-Mod2 | Count: 7 |

FIG. 8

Location-Based Modification of FMS Content    1000

| FMS Screen 1001a | Segment 1001b | Content Presented to Users at Location 1 1001c | Content Presented to Users at Location 2 1001d | Content Presented to Users at Location 3 1001e |
|---|---|---|---|---|
| Screen 1 | Segment 1 | Segment 1-Mod-1 | Segment 1-Mod-1 | Segment1-Mod-1 |
| Screen 1 | Segment 2 | Current-Segment-2 | Current-Segment-2 | Segment2-Mod-1 |
| Screen 2 | Segment 1 | Segment 1-Mod1 | Segment 1-Mod2 | Segment 1-Mod3 |
| Screen 2 | Segment 2 | Segment 2-Mod1 | Segment 2-Mod1 | Current-Segment-2 |

FIG. 10

Screen 1 / Segment 1    1100a

| Feedback Location 1101a 212/241 | Feedback Count 1101b 303 | User Count 1101c | Criteria Satisfied? 1101d | Screen 1 Content Presented to Users at Location 1101e 242 |
|---|---|---|---|---|
| Location 1 | Count-1 | User-Count-1 | Y | Segment1-Mod1 |
| Location 2 | Count-2 | User-Count-2 | Y | Segment1-Mod1 |
| Location 3 | Count-3 | User-Count-3 | Y | Segment1-Mod1 |

FIG. 11A

Screen 1 / Segment 2    1100b

| Feedback Location 1101a 212/241 | Feedback Count 1101b 303 | User Count 1101c | Criteria Satisfied? 1101d | Screen 1 Content Presented to Users at Location 1101e 242 |
|---|---|---|---|---|
| Location 1 | Count-1 | User-Count-1 | N | Current-Segment2 |
| Location 2 | Count-2 | User-Count-2 | N | Current-Segment2 |
| Location 3 | Count-3 | User-Count-3 | Y | Segment2-Mod1 |

FIG. 11B

Screen 2 / Segment 1  1100c

| Feedback Location 1101a 212/241 | Feedback Count 1101b 303 | User Count 1101c | Criteria Satisfied? 1101d | Screen 1 Content Presented to Users at Location 1101e 242 |
|---|---|---|---|---|
| Location 1 | Count-Loc1 | Count-Loc-User1 | Y | Segment1-Mod1 |
| Location 2 | Count-Loc2 | Count-Loc-User2 | Y | Segment1-Mod2 |
| Location 3 | Count-Loc3 | Count-Loc-User3 | Y | Segment1-Mod3 |

FIG. 11C

Screen 2 / Segment 2  1100d

| Feedback Location 1101a 212/241 | Feedback Count 1101b 303 | User Count 1101c | Criteria Satisfied? 1101d | Screen 1 Content Presented to Users at Location 1101e 242 |
|---|---|---|---|---|
| Location 1 | Count-Loc1 | Count-Loc-User1 | Y | Segment2-Mod1 |
| Location 2 | Count-Loc2 | Count-Loc-User-2 | Y | Segment2-Mod1 |
| Location 3 | Count-Loc3 | Count-Loc-User 3 | N | Current-Segment2 |

FIG. 11D

LOCATION-BASED ADAPTATION OF FINANCIAL MANAGEMENT SYSTEM

SUMMARY

Embodiments are directed to location-based adaptation of content of a financial management system (FMS) to reflect suggestions by users at different locations regarding how content should be phrased, worded, translated or expressed.

Certain embodiments are directed to automatic, location-specific adaption of FMS content such that certain content is modified and presented to users at different locations based on location-based or location-specific feedback from users at those locations.

Certain embodiments are directed to geotagging feedback or crowdsourced language suggestions regarding specific FMS content and updating a tracking mechanism such as a counter for proposed modifications involving a particular location, or creating a new tracking mechanism such as a new counter when feedback received from new locations and to track feedback received from those new locations.

Certain other embodiments are directed to location-based or geotagged feedback pattern detection to determine location-based FMS content modifications.

Other embodiments are directed to automatic adaption of FMS content to different language dialects spoken in different locations. FMS content modifications can be performed automatically without the need for a FMS administrator to collect feedback and manually implement FMS changes.

Further embodiments are directed to how FMS content modifications are triggered.

Yet other embodiments are directed to allowing the meaning, wording, phrasing or spelling of specific FMS content to be debated back and forth between or among FMS users at different locations, and when pre-determined criteria is satisfied, detecting feedback patterns and adapting FMS content to those locations by modifying content in one way for one location and in another way for another location based at least in part upon the patterns.

For example, embodiments modify content or other aspects of a FMS to adapt the FMS to different languages or dialects thereof, or to different ways of expressing or interpreting words, phrases, spellings, pronunciations of FMS content. In one embodiment, users in different locations may speak the same language but a different dialect or variant thereof and may provide feedback that a word or phrase should be changed in different ways. Embodiments aggregate location-based feedback, analyze the feedback to identify respective suggestion patterns and determine how content should be modified, and selectively modify particular content in different ways such that a first modified version is then presented to users at one location while the particular content is modified in a different way such that a second modified version is presented to users at another location.

One embodiment is directed to a computer-implemented method for location-based adaptation of FMS content that is performed by an intermediate computer hosting a FMS accessed by different users at different locations. The method comprises receiving feedback from users at a first location and from users at a different, second location that suggests how respective users would modify selected or identified content of the FMS. For example, received feedback may involve a particular word or phrase presented by the FMS, and users at the first location may suggest that the word or phrase be changed in one way while users at the second location may suggest that the word or phrase be changed in another way. This may be due to different languages or aspects or variants thereof such as different dialects, accents, pronunciations, spellings, or accepted grammar for respective locations. The method further comprises the intermediate computer determining whether the received feedback satisfies pre-determined criteria and if so, determining respective location data of respective users associated with respective feedback and modifying or transforming the selected or identified content based at least in part upon respective received feedback and first and second locations. As a result, first modified content is presented to users at the first location and second modified content is presented to users at the second location. In this manner, FMS content is adapted to users that, for example, may be the same country or in different countries and that speak different languages or different dialects of the same language.

Another embodiment is directed to a computer-implemented method for location-based adaptation of FMS content that is performed by an intermediate computer hosting a FMS accessed by different users at different locations and comprises the intermediate computer receiving feedback from users at a first location and from users at a second location different from the first location. The feedback suggests how the users would modify identified or selected content of the FMS. The method further comprises tagging or associating respective feedback with respective location data. Location data may be an Internet Protocol (IP) address of a user's computing device and/or geographic location data of or provided by the user. The method further comprises determining whether feedback satisfies pre-determined criteria, and if so, determining respective location data of respective users associated with respective tagged feedback and identifying or detecting a first pattern of feedback by users at the first location suggesting that content of the FMS be modified in the same or substantially similar manner and a second pattern of feedback by users at the second location suggesting that content of the FMS be modified in the same or substantially similar manner. FMS content is modified based at least in part upon respective patterns such that first modified content based at least in part upon the first pattern is presented to users at a first location and second modified content based at least in part upon the second pattern is presented to users at a second location different from the first location. In this manner, FMS content is adapted to users that, for example, may be the same country or in different countries and that speak different languages or different dialects of the same language.

Yet another embodiment is directed to a computer-implemented method for location-based adaptation of FMS content that is performed by an intermediate computer hosting a FMS and comprises the intermediate computer receiving crowdsourced feedback or feedback from a group or community of FMS users that is volunteered or provided by the FMS users and suggests how respective users at respective different locations would modify specific content of the FMS. The method further comprises tagging respective crowdsourced feedback with respective location data such as one or more of an Internet Protocol (IP) address of a computing apparatus from which the crowdsourced feedback was received and geographic location data of a user. The method further comprises determining whether tagged feedback satisfies pre-determined feedback count criteria, and if so, determining respective location data of respective users associated with respective tagged feedback, and identifying respective feedback patterns associated with respective location data. FMS content is modified based at least in part upon respective identified patterns such that first modified content based at least in part upon a first identified pattern is presented to users at a first location and second modified content based at least in part upon a second identified pattern is presented to users at a second location different from the first location. In this manner, FMS content is adapted to users that, for example, may be the same country or in different countries and that speak different languages or different dialects of the same language.

Further embodiments are directed to articles of manufacture or computer program products comprising a non-transitory computer readable storage medium embodying one or more instructions executable by an intermediate computer hosting or managing a FMS and for performing embodiments involving location-based adaptation of FMS content.

Yet other embodiments are directed to systems configured for location-based adaptation of financial management system content. A system may comprise an intermediate computer hosting the FMS and that is configured to execute steps for location-based adaptation of FMS content. System embodiments may comprise or involve computerized system components such as an aggregator, counter, comparator and analyzer. The aggregator receives and processes received feedback, and counters are associated with different locations and incremented when feedback is received from a location or from a user to track how many times feedback has been received from a location or how many users have submitted feedback. The comparison circuit is configured to receive as inputs pre-determined criteria and the output(s) of the counter(s) and compare counter outputs with the pre-determined criteria to determine which location has received sufficient feedback that is to be used for modifying FMS content. The pattern analyzer is configured to access and review feedback suggestions in feedback from locations identified as satisfying the pre-determined criteria to identify feedback suggestion patterns for those locations, and to execute corresponding modifications to the FMS.

In a single or multiple embodiments, the FMS content that is modified and adapted to different locations is word or phrase such that the word or phrase that was presented and that was the subject of feedback is modified to a variant thereof or to a different word or phrase or spelling. For example, the word or phrase may be modified to adapt to a particular manner in which a word or phrase is used, spelled, pronounced, or to adapt to another linguistic attribute of that location, which may be a country, region, state or neighborhood with identifiable linguistic attributes.

In a single or multiple embodiments, the pre-determined criteria comprises a minimum or threshold feedback-related count. For this purpose, embodiments may utilize counters associated with respective locations such that a number of times feedback is received from different locations can be tracked and location-specific counters can be incremented as feedback is received. A new counter may be generated and/or assigned to that new location when it is determined that feedback is received from a new location or a location from which feedback has not been received previously.

In a single or multiple embodiments, the pre-determined criteria is a pre-determined, minimum or threshold count or number and/or percentage of users at each location that provided feedback about how presented content should be modified. Thus, for example, content modifications may occur only after a minimum number of different users, or a minimum percentage of all users within a certain location provide feedback regarding how to change certain content.

In a single or multiple embodiments, the pre-determined criteria or count may be the same or different for multiple locations, e.g., depending on whether it is determined that feedback from one location may be more or less reliable than from another location, or depending on the number of users of the financial management system. For example, different count thresholds may be employed if certain locations have more users than other locations such that a larger user count is needed before changing content for the location with the larger number of users. In another embodiment, the pre-determined criteria is a pre-determined, minimum or threshold number of times feedback has been received from different locations such that counts would include the same or different users submitting feedback one or more times. Embodiments may also utilize a combination of pre-determined criteria such as a combination of number of users and percentage of users.

In a single or multiple embodiments, when the pre-determined criteria has not been satisfied (e.g., a threshold number feedback suggestions has not been received or a threshold number of users has not provided feedback), the intermediate computer may continue to present current or unmodified FMS content to all users at all locations, until the pre-determined criteria is satisfied and the current content is modified. The current content may be original or unmodified content, which has not undergone any location-based modification. The current content may also be content that was previously modified at least once based on prior feedback, but is not modified again until the pre-determined criteria is satisfied. When or while the pre-determined criteria is not satisfied, the intermediate computer may continue to receive additional location-based feedback, and when the pre-determined criteria is satisfied, modify the associated content of the FMS based at least in part upon the received feedback such that the first modified content is presented to users at the first location and the second modified content is presented to users at the second location.

In a single or multiple embodiments, FMS content is modified to reflect different languages spoken by users at the different locations. In a single or multiple embodiments, FMS content is modified to reflect different dialects of the same language spoken by users at different locations, or to reflect other different language attributes such as location-specific spellings, usage or pronunciations of words or phrases presented by the FMS. Embodiments may be utilized to adapt FMS content to users in different countries or states or regions thereof. For example, a language may be spoken by users from different continents (e.g., Europe and South America), and FMS content that does not apply to both of these countries can be automatically adapted to different languages or dialects of that same language spoken by users at those different locations. As another example, a different language or dialect may be spoken by users in different regions of the same country, and embodiments may be used to automatically adapted to the dialects spoken in those different regions.

In a single or multiple embodiments, after location-based modifications are determined, the computer hosting the FMS or managing content modifications thereof can transmit updates to computing devices of respective users at respective locations such that updates to desktop versions of the FMS are updated. At a first location, the desktop updates incorporate first modified content, and at the second location, desktop updates incorporate second modified content. For on-line versions, updates can be incorporated into a centrally hosted FMS, different versions of the FMS or FMS versions reserved for particular locations may be created such that when users at a first location access the on-line FMS, they are directed to or access a first version incorporating first modified content for that location, whereas other users at a different, second location access the on-line FMS and are directed to or access a second version incorporating second modified content for that second location. Thus, when some, but not all, of the FMS is modified, users at different locations are presented with the same current or unmodified content for that location and respective modifications based at least in part upon location-based feedback.

In a single or multiple embodiments, feedback that is received from different locations and used to implement location-based modifications involves the same word or phrase displayed within a screen generated by the FMS. Thus, after pre-determined criteria is satisfied, the same word or phrase may be modified in different ways for the different locations or first content can be modified for a first location and second content can be modified for a second location.

The location data that is utilized according to embodiments may be in the form of an Internet Protocol (IP) address of a computing apparatus that accesses the FMS and/or geographic location data provided by a user of the FMS, determined from user registration or profile data.

Counters can be assigned to respective locations, and when location-based pre-determined criteria is satisfied, the corresponding modification is determined or identified, e.g., based at least in part upon patterns determined or identified with in the feedback from a particular location.

BRIEF DESCRIPTION OF THE DRAWINGS

The foregoing and other aspects of embodiments are described in further detail with reference to the accompanying drawings, wherein:

FIG. 5 generally illustrates a data structure identifying financial management system content in the form of screens or pages and segments or portions thereof;

FIG. 8 generally illustrates a data structure identifying content of a financial management system and how suggested location-based modifications to the content are tracked utilizing a counter;

FIG. 10 generally illustrates a data structure identifying location-based modifications to financial management system content that were executed;

FIG. 11A generally illustrates a data structure illustrating whether and how a particular first segment of a first financial management screen has been modified according to embodiments, FIG. 11B generally illustrates a data structure illustrating whether and how a particular second segment of a first financial management screen has been modified according to embodiments, FIG. 11C generally illustrates a data structure illustrating whether and how a particular first segment of a second financial management FMS screen has been modified according to embodiments, and FIG. 11D generally illustrates a data structure illustrating whether and how a particular second segment of a second financial management screen has been modified according to embodiments;

DETAILED DESCRIPTION OF ILLUSTRATED EMBODIMENTS

Embodiments are directed to location-based adaptation of financial management system (FMS) content to users at different locations. With embodiments, users that speak different dialects or variations of the same language can be presented with FMS content that is adapted to their respective dialects. Embodiments are able to achieve a greater degree of adaptation to particular aspects or nuances of a user's language or dialect thereof by tracking feedback from users and the locations of the users or feedback sources, together with making content modifications depending on whether pre-determined criteria has been satisfied and location-based feedback pattern detection triggered thereby. For example, embodiments may involve receiving and processing feedback from users in Spain and Argentina about how those users would modify content of a FMS (such as a word or phrase displayed by the FMS) given their particular interpretations and dialects of the Spanish language. The FMS would be modified such that FMS content is adapted to Castellano Spanish spoken by users in Spain and to Argentinian Spanish spoken by users in Argentina.

Figure 1:
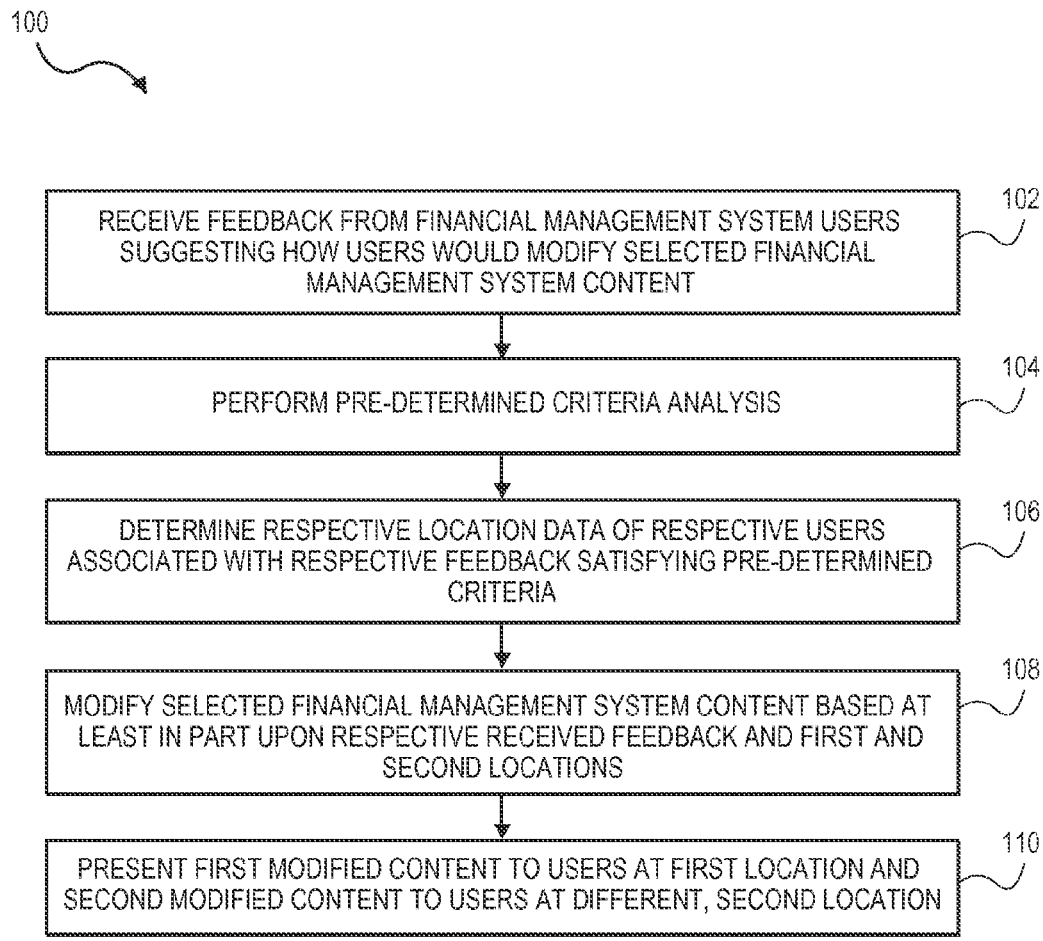
FIG. 1 is a flow diagram illustrating one embodiment of a computer-implemented method for modifying a financial management system for users at different locations to adapt the financial management system to language variations at the different locations.

Referring to FIG. 1, according to one embodiment, at 102, feedback is received from FMS users at different locations suggesting how the users would modify FMS content selected or identified by the users. Embodiments may involve different locations of different countries or regions, states or other areas or neighborhoods thereof associated with distinguishable linguistic attributes, variations or dialects. At 104, an analysis of the received feedback relative to pre-determined criteria is performed, and at 106, respective location data of respective users associated with respective feedback satisfying pre-determined criteria is determined. At 108, content of the financial management system that was selected or that was the subject of the feedback is modified based at least in part upon respective feedback and associated first and second locations such that, at 110, first modified content adapted to language nuances or dialects of a first location is presented to users at the first location and second modified content adapted to language nuances or dialects of a second location is presented to users at the second location. Embodiments and aspects thereof are described in further detail with reference to FIGS. 2-15.

Figure 2:
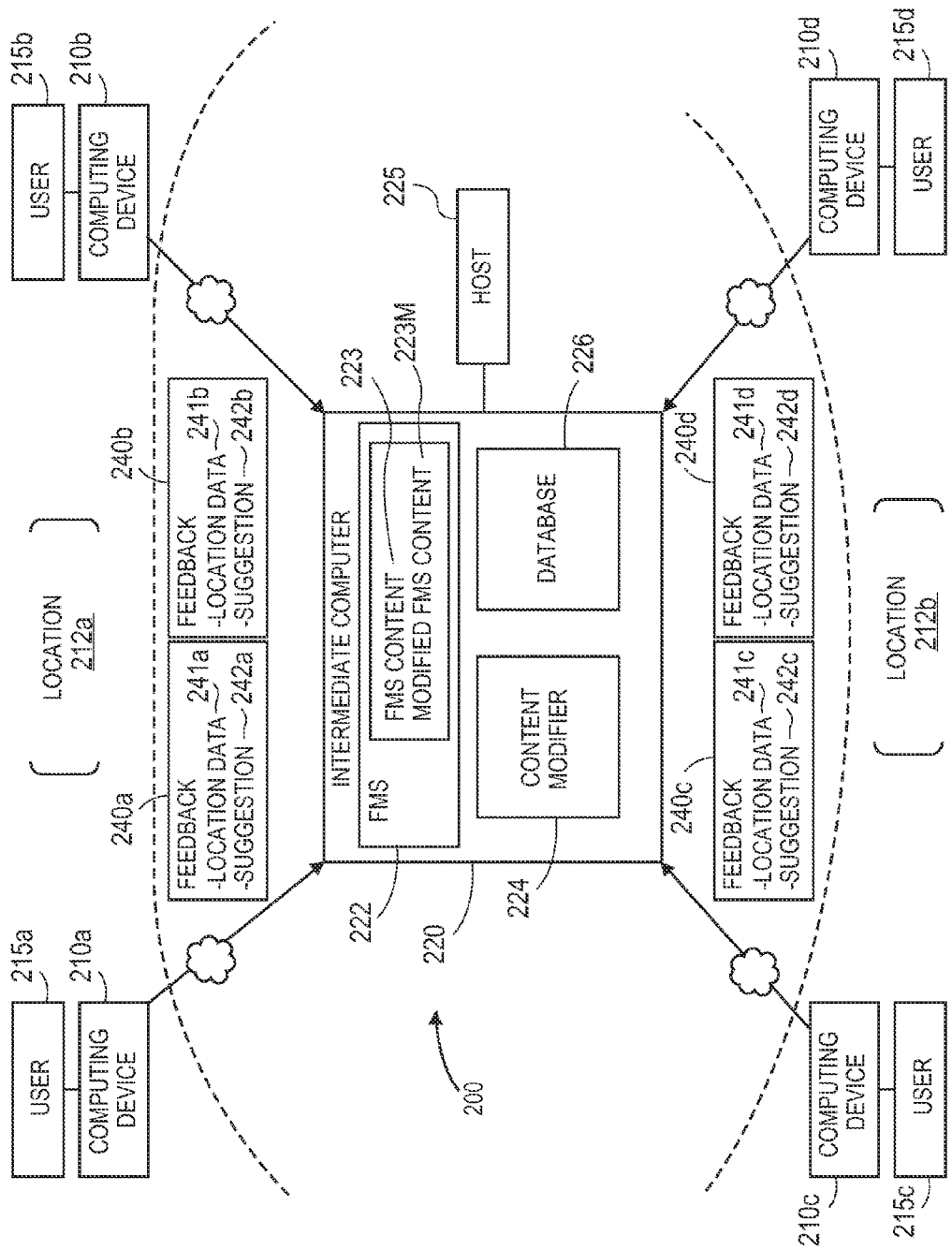
FIG. 2 illustrates how system embodiments may be implemented to modify financial management system content for users at different locations to adapt the financial management system to language variations at the different locations.

Referring to FIG. 2, a system 200 constructed according to one embodiment for adapting a FMS to users 215a-d (generally, user 215) at different locations 212a-b (generally, location 212) comprises or involves users or people having accounts with a FMS 222 that are at different locations and utilize respective computing devices 210a-d (generally, computing device 210) to access the FMS 222. In the illustrated embodiment, the FMS 222 is hosted by an intermediate computer 220 and managed by a host 225. Examples of a FMS 222 include QUICKBOOKS, QUICKBOOKS UN (international version) QUICKEN, MINT and FINANCEWORKS financial management systems available from a host 225 such as Intuit Inc., Mountain View, Calif. QUICKBOOKS, QUICKEN, MINT and FINANCEWORKS are registered trademarks of Intuit Inc.

In the illustrated embodiment, the FMS 222 is an on-line financial management program or product that may be executed or accessed by execution of a browser on a computing device 210 or by the user 215 establishing another type of network connection with the intermediate computer 220 to access the FMS 222 or website including the FMS 222. The user 215 may then execute the FMS 222 and access the user's account to manage various financial matters.

The user computing device 210 may be a desktop computer, laptop computer or a mobile computing or communication device such as a tablet computing device, cellular telephone or smartphone that can communicate with the intermediate computer 220. For ease of explanation, reference is made generally to a user computing device 210, which may execute a desktop or local version of the FMS 222 or access the FMS 222 through one or more networks. For a web-based FMS 222, the user computing device 210 may execute web browsers such as INTERNET EXPLORER, GOOGLE CHROME and MOZILLA FIREFOX browsers.

As shown in FIG. 2, user computing devices 210a-d are in communication with or operably coupled to the intermediate computer 220 via respective networks 230a-d (generally, network 230). Examples of networks 230 that may be utilized for communications between system components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 230 generally, but various networks, combinations of networks and communication systems, methods and protocols may be utilized.

Further, while certain embodiments may involve desktop or locally executing FMS 222, for ease of explanation, reference is made primarily to the system configuration shown in FIG. 2 in which the FMS 222 is hosted by the intermediate computer 220 and users 210 access the FMS 222 utilizing their respective computing devices 210 through a network 230.

FIG. 2 illustrates an example involving four users 215a-d from two locations 212a-b. It will be understood that embodiments may involve tens, hundreds and thousands of users and/or locations such that FIG. 2 illustrates a simplified example of how embodiments may be implemented. In the illustrated embodiment, two users 215a-b are from a first location 212a or Location 1, and two other users 215c-d are from a different, second location 212b or Location 2. The different locations 212a, 212b may be different countries or different states or regions or neighborhoods thereof, which are divided by recognized boundary lines or identified by linguistic attributes.

In the embodiment illustrated in FIG. 2, the intermediate computer 220 hosts the FMS 222, which may involve content 223 in the form of data to be managed and/or user interface displays or screens presented to users. While FIG. 2 shows content 223 and content that is modified 223M according to embodiments as part of FMS 222, it will be understood that the FMS data may be stored in one or more data stores or databases 226. Managed data and UI displays or screens may involve collection, organization and storage of one or more of accounting, financial and transaction data and generation of reports, financial summaries such as profit/loss, accounts receivable, payroll, income, expense, budget, invoices and other summaries and reports that are presented to users 215 to allows users 215 manage various financial and accounting matters. Such management may involve allowing users 215 to analyze income, accounts receivable, expenses, spending categories and patterns on certain items, inventory and purchases made by or from certain merchants or vendors. A FMS 222 is defined to include, any computing system implemented, on-line or web-based, system, package, program, module, or application that gathers accounting, financial and/or transaction data, has the capability to receive or retrieve and/or analyze such data and categorize at least part of the data into various reports or displays that are provided to the user, and provide the user with the capability to conduct, and/or monitor, accounting and financial actions, operations, transactions and data.

Figure 3:
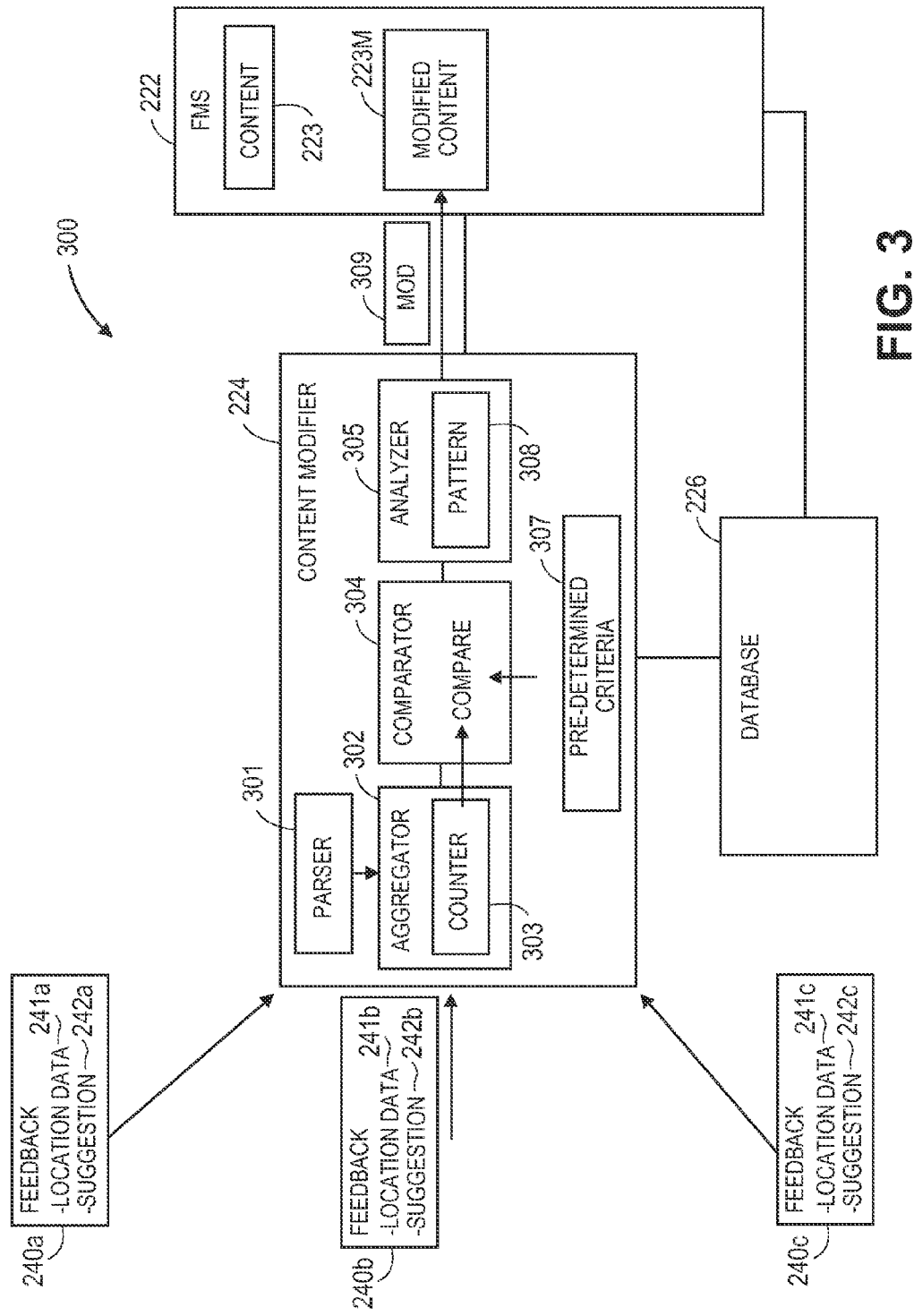
FIG. 3 illustrates in further detail how one embodiment may be implemented to receive and process feedback and adapt financial management system for users at different locations to adapt the financial management system to language variations at the different locations.

In the illustrated embodiment and with further reference to FIG. 3, in a system 300 constructed according to one embodiment, the FMS 222 includes or communicates with a content modifier 224 that is configured to determine which FMS content 223 is modified and when and how FMS content 223 is modified. The content modifier may be a plug-in, module or program of the FMS 222 or that is in communication with the FMS 222 and in communication with a database, table or other data structure 226 (generally, database 226). The content modifier 224 is configured to analyze electronic feedback 240a-c (generally, feedback 240) provided by users 215 of the FMS 222 from different locations 212 and determine if and when user suggestions 242a-c within the feedback 240 regarding how certain FMS content 223 should be modified are implemented.

In the embodiment illustrated in FIG. 3, the content modifier 224 includes or executes a segmentation module or parser 301 (generally, "parser" 301), a feedback aggregator or electronic feedback collection module 302 (which is also shown as having or updating one or more counters 303 associated with location data 241 of feedback 240), a comparison module or comparator 304, and an analyzer 305. Feedback data 240 and data of results or outputs generated by content modifier 224 components can be stored to database 226.

Figure 4:
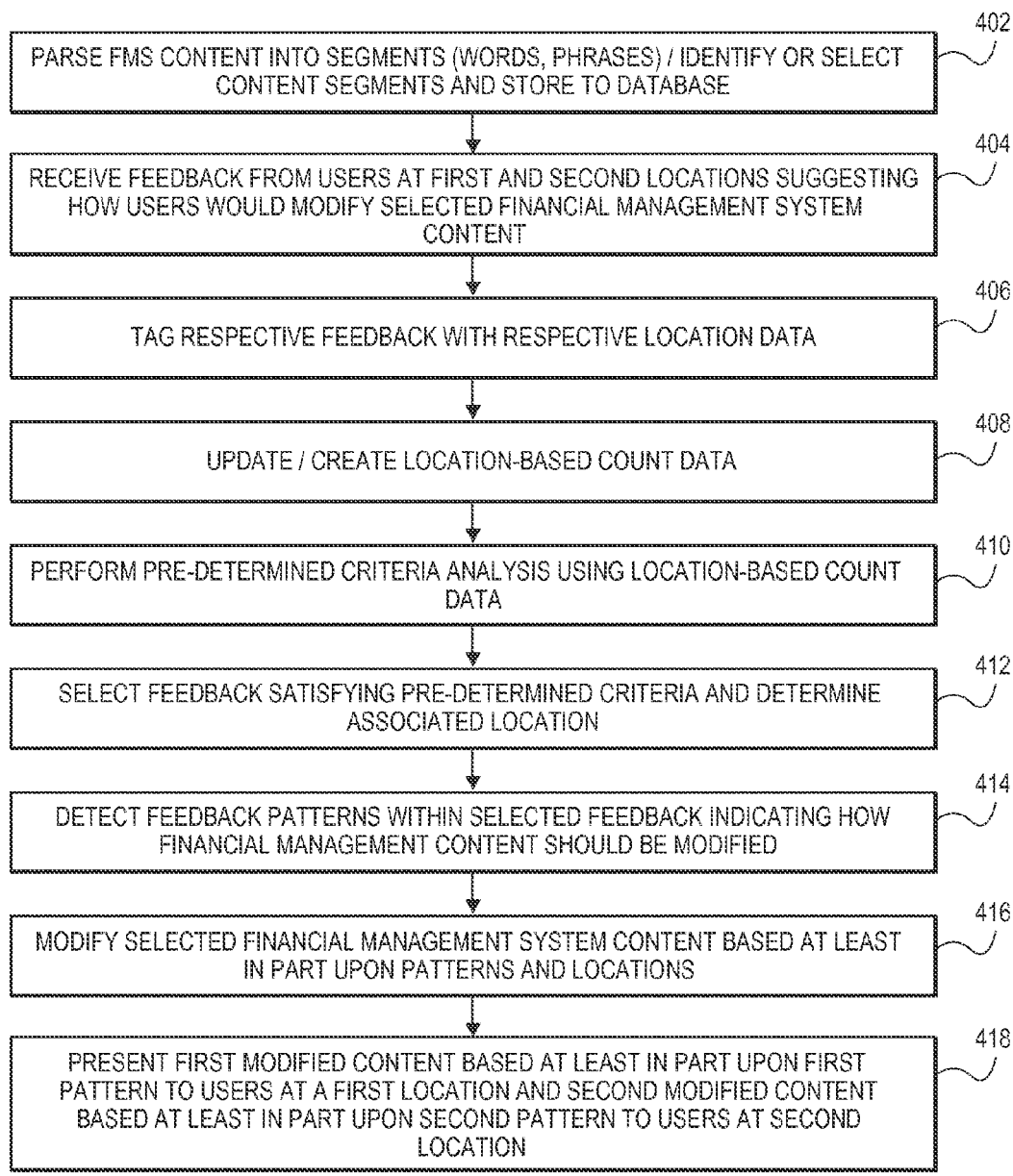
FIG. 4 is a flow diagram illustrating one embodiment of a computer-implemented method for modifying a financial management system for users at different locations to adapt the financial management system to language variations at the different locations involving processing of location, counter and pre-determined criteria data.

With further reference to FIGS. 4-5, in a method according to one embodiment, at 402, the parser 301 receives FMS content 223 and identifies or selects FMS content 223 as components or segments 223S ("S" referring to segment") that may be the subject of feedback 240. Segments 223S may, for example, be individual words or phrases presented within a screen or interface generated by the FMS 222 and displayed to a user 215. The resulting segments 223S can be stored in the database 226, e.g., in the form of a table 500 including columns 502a-b for an identifier or label for a screen of the FMS 222 and segments 223S of the screen.

Figure 6:
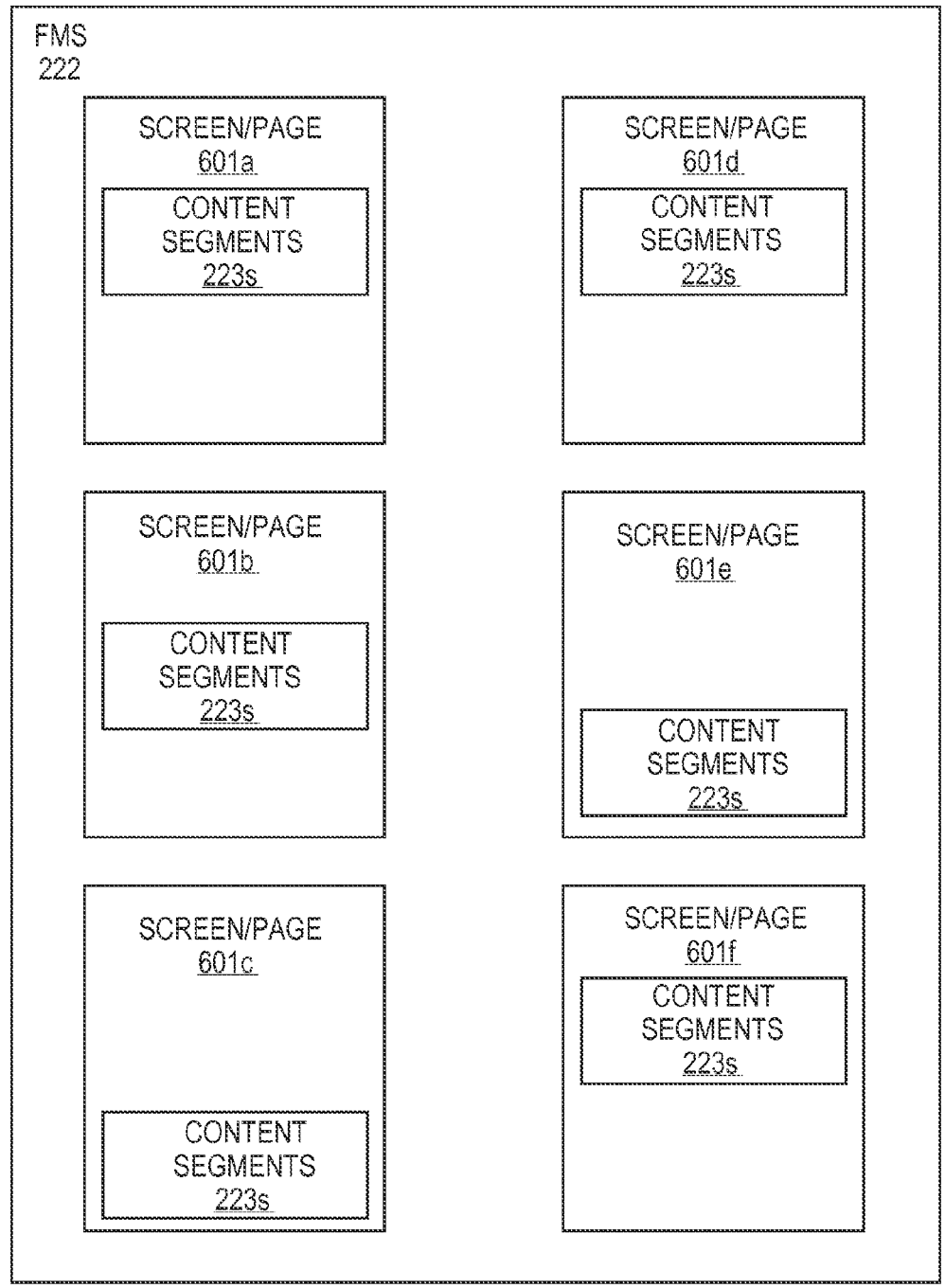
FIG. 6 generally illustrates screens or pages of a financial management system and segments or portions thereof.

For example, referring to FIG. 6, the FMS 222 is generally illustrated as including or presenting a plurality of pages or screens 601a-f (generally, screen 601) with associated content 223 including or in the form of segments 223S such as words, phrases, sentences or other forms of written or audio-visual expression that conveys meaning or data to a user 210. While FIG. 6 illustrates six screens 601a-f and associated content 223 as an illustrative example, it will be understood that the FMS 222 may present hundreds or thousands of screens 601 with different types of content 223 and segments 223S thereof for various accounting and financial matters. Accordingly, it will be understood that FIGS. 5 and 6 are provided as simplified examples of how a FMS 222 may be structured to present or display various screens 601 and content 223 to a user 210 and that can be processed by the parser 301 to identify or select content segments 223S.

Referring again to FIGS. 3-4, the aggregator 302 is in communication with the database 226 and serves as an interface to receive feedback 240 received from FMS users 215 at 404. The aggregator 302 is configured to determine or extract location data 241 from the received feedback 240, identify the FMS content 223 or segment 223S (generally, content 223) to which a suggestion or suggested change 242 of the feedback 240 pertains. The aggregator 302 can also create a table or database or update an existing table or database with the location data 241 associated with the received feedback 240 and with the suggested change 242 to a content 223 identified or selected by the user 215 that provided the feedback 240, and tag or link the feedback suggestion 242 with the location data 241 in the table at 406. At 408, the aggregator 302 updates a counter 303, e.g., location-based or location-specific counter, such that when feedback 240 is received from a particular location, the counter 303 is incremented. In certain embodiments, a counter 303 is incremented each time feedback 240 is received regardless of whether the same user 215 submits feedback multiple times. In other embodiments, a counter 303 is incremented each time a different user submits feedback 240 from the associated location. Other embodiments may involve multiple counters 303. Counters 303 that exist for a location may be updated or incremented, and a new counter 303 for a new location may be created and subsequently updated.

The aggregator 302 and counter 303 may be elements of the same component or separate components. For ease of explanation, reference is made to an aggregator 302 configured to process received feedback 240 by identifying the FMS content 223 or segment 223S that is the subject of the feedback 240, location data 241 of the source of the feedback 240 (e.g., location of a computer 210 and/or user 215 that submitted or transmitted the feedback 240), updating the counter 303 associated with the location 241, and storing the associated suggestion 242 in the database 246.

The comparator 304 is in communication with the aggregator 302 and receives the updated output of the location-based counter(s) 303. At 410, the comparator 304 performs an analysis or comparison involving the output of the counter 303 and pre-determined criteria 307 such as a pre-determined minimum or threshold count.

At 412, when the pre-determined criteria 307 is satisfied, the comparator 304 triggers the analyzer 305 to access the database 226, extract data of feedback 240 associated with the counter 303 data that satisfied the pre-determined criteria 307, analyze the suggestions 242 within that feedback 240, and detect or identify a location-specific pattern 308 of the suggested modification 242 at 414. At 416, the analyzer 305 executes a modification 309 to the FMS content 223 or segment 223S thereof based on the pattern 308 such that at 418, FMS content 223 or segment thereof 223S is modified 309 based at least in part upon the location-based feedback 240. The modified content 223M ("M" referring to "modified") is then presented to users 215 at that associated or linked location 241/212.

Presentation of modified content 223M may be implemented in different ways. In one embodiment, new versions of the FMS 222 incorporating respective modified content 223M are created. Thus, a first version of the FMS 222 may be for the first location 212a, and a second version of the FMS 222 may be for the second location. In another embodiment, the base or original FMS 222 may be utilized, and conditional or "if-then" statements can be used to determine which modified FMS content 223M should be presented rather than the original or base case content and access such content in the database 226. For example, if a FMS 222 determines that there are users from Locations 1 and 2, then the FMS 222 may execute an "if-then" statement of "if user is from Location 1 then replace "ABC" with "XYZ" and execute a different if-then statement of "if user is from Location 2 then replace "ABC" with "123."

For example, embodiments may execute a first modification 309a to certain FMS content 223 and a second, different modification 309b to that FMS content 223 such that the first modified content 223M-1 is presented to users 215 at a first location 212a and the second modified content 223M-2 is presented to other users 215 at the different, second location 212b. Aspects of embodiments are described in further detail with reference to FIGS. 7-15.

Figure 7:
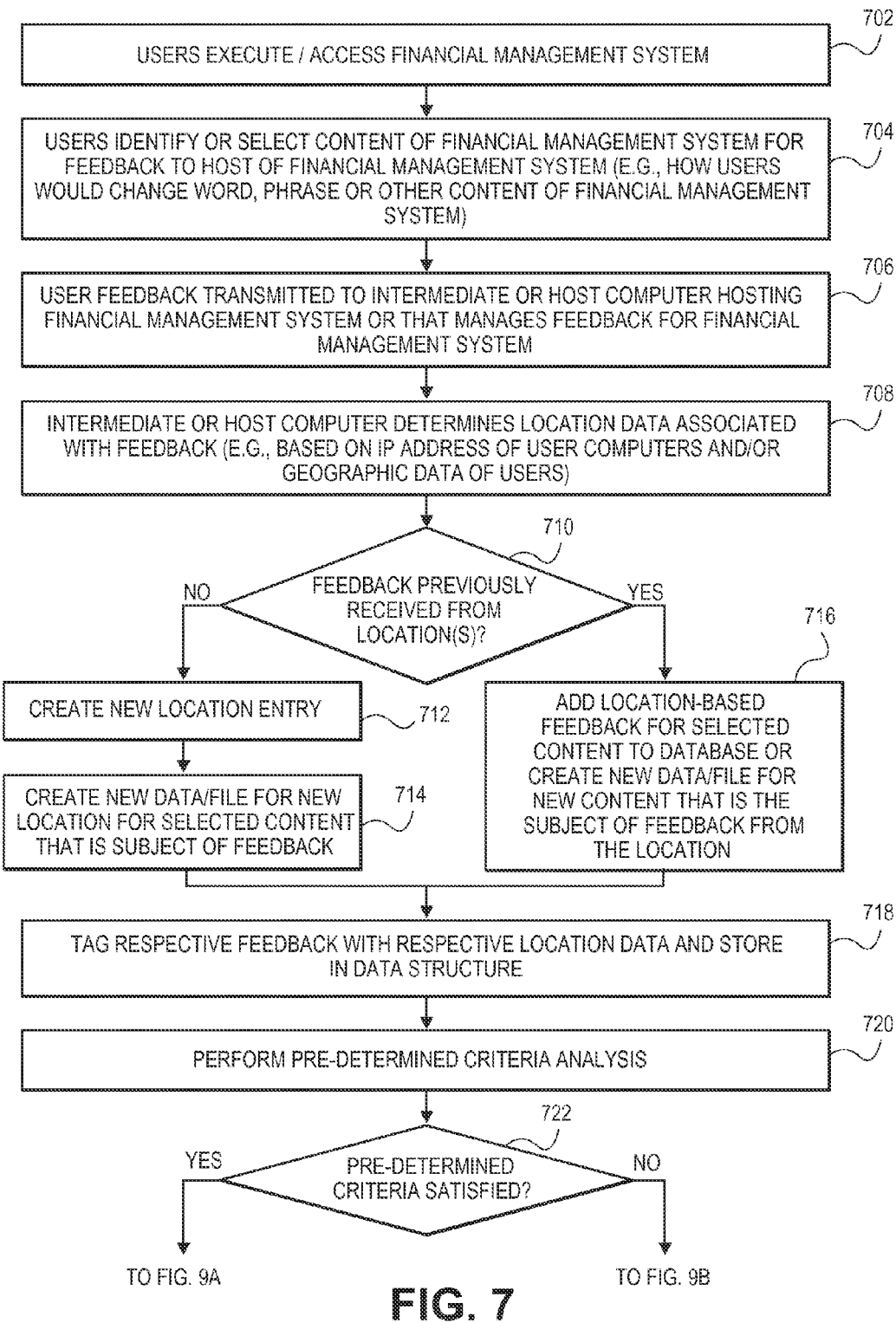
FIG. 7 is a flow diagram illustrating one embodiment of a computer-implemented method for modifying a financial management system for users at different locations to adapt the financial management system to language variations at the different locations and showing in further detail how location data of feedback and comparisons involving pre-determined criteria are processed.

Referring to FIG. 7, a method according to one embodiment involves or comprises users 215 executing or accessing FMS 222 at 702, and at 704, identifying or selecting content 223 or segments 222S thereof for feedback 240 or suggested edits to the FMS content 223 to the host 225. The feedback 240 may involve suggestions 242 of how users 215 would change a word, phrase or other content 223 or segment 222S thereof given their dialect or variation of a spoken or written language. At 706, the feedback 240 is transmitted to and received by the intermediate computer 220 hosting the FMS 222 or other computer that manages feedback 240 for the FMS 222. At 708, the intermediate computer 220, or the aggregator 302 of the content modifier 324, determines location data 241 of or associated with the feedback 240.

According to one embodiment, the location data 241 is transmitted with the feedback 240 (as illustrated in FIG. 2). In other embodiments, the location 241 data may be determined by the FMS 222 such as when the identified user 240 is registered with the FMS 222 and has already provided location data 241. According to one embodiment, the location data 241 is a physical location of the user's computing device 210 determined from an Internet Protocol (IP address) of the computing device 210. The IP address is a logical address of a network adapter and is a unique series of numbers that identifies computers on a network. Each user computing device 210 utilized to access the FMS 222 through a network 230 is assigned an IP address, and this data may be used to determine the physical location of the user's computing device 210 or the origin of the feedback 240. According to another embodiment, the location data 241 is geographic location data such as an address, city, state or other location data provided by the user 215 during registration with the FMS 222 or submitted together with the feedback 240.

At 710, the aggregator 302 determines whether the content modifier 224 has received feedback 240 from the determined or identified location 241. For this purpose, the aggregator 302 may search the database 246 for existing feedback entries identifying the determined or identified location 241. If not, then at 712, the aggregator 302 may generate a new database entry for the location 241, and at 714, new data or a new file or database entry associated with that location 241 is created for the received feedback suggestion 242. Otherwise, at 716, the aggregator 302 determines that feedback 240 from this location 241 has been received previously and modifies the database 226 to add the received feedback 240, which addresses FMS content 223 that was not previously addressed by prior feedback or that supplements prior feedback regarding previously addressed content 223.

At 718, the aggregator 302 tags or associates respective feedback suggestions 242 with respective location data, e.g., by a link or association in the table or database, and at 720, counter 303 data is provided to the comparator 304, which performs an analysis of pre-determined criteria 307 to determine whether the feedback received thus far from the location satisfies the pre-determined criteria 307 such that the FMS content 223 can be modified based on the feedback.

According to one embodiment, in which a counter 303 is incremented each time feedback 240 is received from a location, the pre-determined criteria 307 is a threshold or minimum count number. For example, the threshold may be "10" such that feedback must be received from a particular location at least 10 times, in which case the comparator 304 compares a current count of the counter 303 for that location to the threshold count of 10.

According to another embodiment, in which a counter 303 is incremented each time feedback is received from different user at a location, the pre-determined criteria 307 is a threshold or minimum number of users 215, such as 10 different users at a given location. In this embodiment, the comparator 304 compares a current count of the counter 303 indicating the number of different users 215 that provided feedback concerning selected FMS content 223 to the threshold count of 10.

According to another embodiment, multiple counters 303 are used and consider the number of times feedback 240 is received from a location 241 and the number of different users 215 from that location 241 that have provided feedback 240.

Data of the counter 303 and the pre-determined criteria 307 may be based on the number of times feedback 240 has been received and/or a number of users 215 that have submitted feedback 240, or the pre-determined criteria 307 may involve threshold percentages that are variable depending on the number of feedback 240 responses received. For example, if the FMS 222 has 1,000 users per day, the pre-determined criteria 307 may be a certain percentage of the total number of users 215, e.g., 50%, whereas if the FMS 222 has only 50 users per day, the pre-determined criteria 307 may be a higher percentage of users 215, e.g., 80% of all users 215.

Thus, certain embodiments may involve fixed pre-determined criteria 307 whereas others involve variable pre-determined criteria 307 depending on factors such as the number of FMS users 215, a number of FMS users 215 for a pre-determined period of time and the number or percentage of users 215 at a particular location 212 that have provided feedback 240 regarding how FMS content 223 should be modified. For ease of explanation, reference is made generally to a count of the number of times location-based feedback 240 has been received, and the comparator 304 utilizing a pre-determined threshold or minimum number of times such feedback 240 has been received.

For example, FIG. 8 illustrates a table or other data structure 800 that may be created and updated by the aggregator 302 and that includes columns 801*a-d* for identifying the FMS content 223, location data 241 of the feedback 240, the suggested modification 242 within the feedback 240, and a running count or output of a counter 303 associated with a location indicating how many times feedback 240 has been received from users at that location 212. In the illustrated example, the aggregator 303 has received feedback 240 regarding certain FMS content 601 of a screen 601 from users at Location 1 212*a* a total of six times. Five of the six times the feedback suggested to change the current content to Modified-ver1 (Segment1-Mod1), whereas one time, the feedback 242 suggested to change that same current content to Modified-ver2 (Segment1-Mod2). Similarly, in the illustrated example, the aggregator 302 has received feedback 240 regarding FMS content from users 215 at a different Location 2 212*b* a total of seven times, and in this case, all seven instances of the feedback 242 suggested to change the current content to Modified-ver2. Thus, the aggregator 302 can maintain details regarding which particular FMS content 223 has been the subject of received feedback 240 and utilizing one or more counters 303 associated with the locations 212 to track how many times feedback 240 has been received from users 215 at particular locations 212 and/or how many users 215 have submitted feedback 240.

Figure 9A:
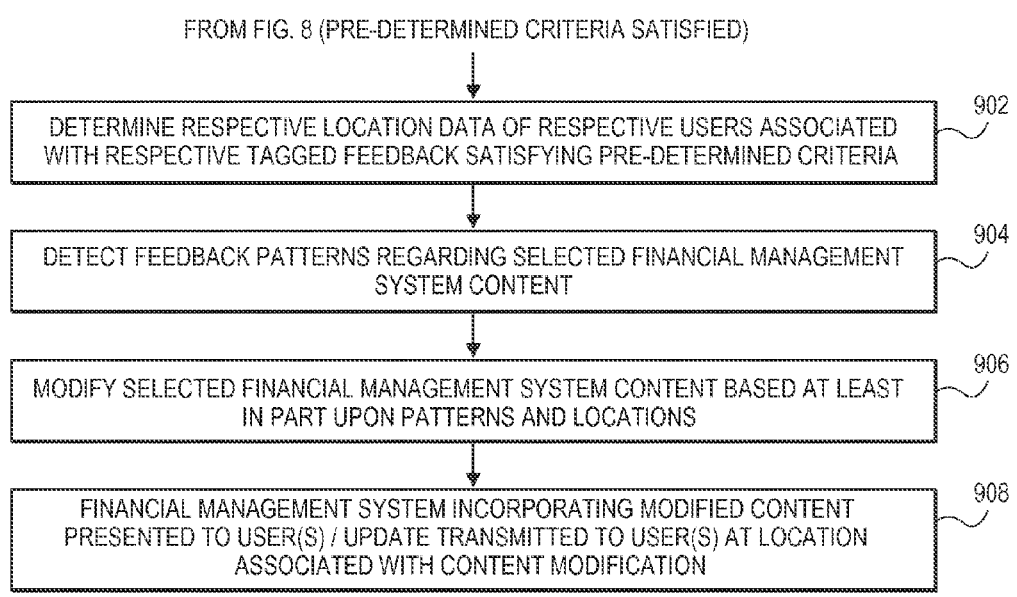
FIG. 9A is a flow diagram illustrating method steps when pre-determined criteria is satisfied.
Figure 9B:
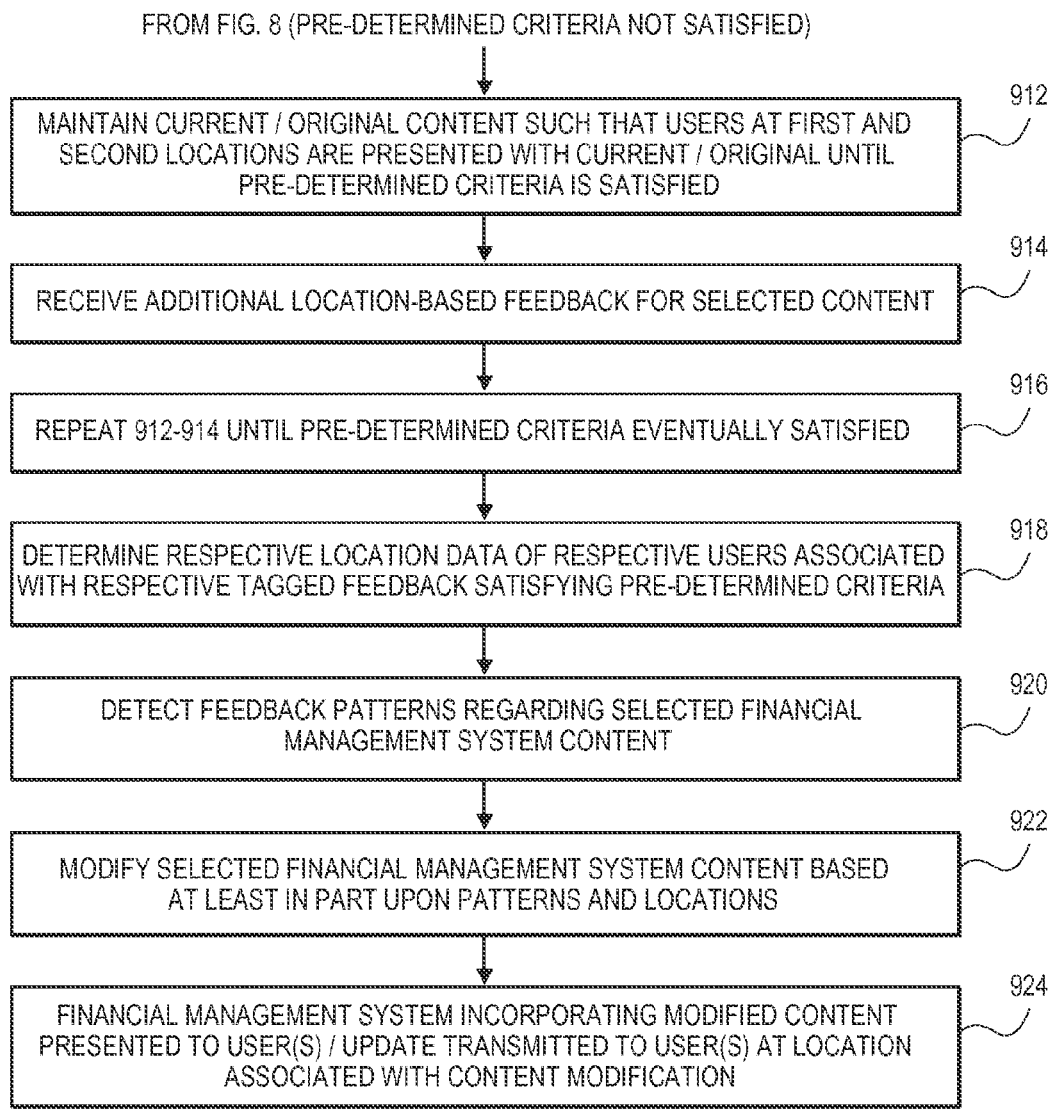
FIG. 9B is a flow diagram illustrating method steps when pre-determined criteria is not satisfied.

Referring again to FIG. 7, at 722, the comparator 304 compares the data of a counter 303 and the pre-determined criteria 307, e.g., in the form of a number of times feedback 240 has been received, and if the pre-determined criteria 307 has been satisfied, the comparator 304 proceeds to FIG. 9A, else proceeds to FIG. 9B.

Referring to FIG. 9A, when the pre-determined criteria 307 has been satisfied, at 902, the comparator 304 triggers the analyzer 305 to determine respective location data 241 of respective users 215 associated with respective tagged feedback 240 satisfying pre-determined criteria 307 and, at 904, analyzes the suggested modifications 242 within the feedback 240 for that location 212 to detect or identify patterns 308 of suggested modifications to the FMS content 223.

At 906, the analyzer 305 detects, identifies, determines or extracts a pattern 308 of the feedback suggestions 242, e.g., based on all or a majority of the suggestions 242 associated with a location 212 or location data 241 being the same or substantially the same. At 908, the analyzer 305 initiates a modification 309 of that selected content 223 that was the subject of the feedback suggestions 242 based at least in part upon the detected pattern 308 for a particular location 212. Continuing with the example shown in FIG. 8, the analyzer 308 modifies original or current FMS content 223 to modified content 223M-1 for users 215 in a first location 212a and modifies the original or current FMS content 223 to modified content 223M-2 for users 215 in a different, second location 212b. At 908, after the FMS modifications or updates 309 have been completed, the FMS 222 incorporating respective modified content 223M is presented to users 215 at respective locations 212a, 212b. In the event that embodiments involve desktop versions of the FMS 222, the intermediate computer 220 can transmit an update to the FMS 222 to user computers 210 at respective locations 212a, 212b that incorporates modification(s) 309.

Referring to FIG. 9B, when the pre-determined criteria 307 is not satisfied, the comparator 304 does not trigger the analyzer 306, and at 912, the current or original FMS content 223 that was the subject of feedback 240 remains unchanged such that users 215 at all locations 212a, 212b continue to be presented with the current or original content 223 until pre-determined criteria 307 is satisfied and a modification 309 is executed. At 914, the aggregator 302 continues to receive additional location-based feedback 240 for selected content 223, and at 916, steps 912-914 are repeated until pre-determined criteria 307 eventually satisfied (if it is satisfied).

Continuing with reference to FIG. 9B, at 918, when the pre-determined criteria 307 has been satisfied, the comparator 304 triggers the analyzer 305. The analyzer 305 accesses the database 226 and determines respective location data 241 of respective users 215 associated with respective tagged feedback 240 satisfying pre-determined criteria 307 and at 920-924, analyzes the suggested modifications 242 for that location 241/212 to detect or identify patterns 308 of how the FMS content 223 should be modified. The analyzer 305 determines, identifies or extracts a pattern 308, and executes a modification 309 of selected FMS content 223 that was the subject of the feedback suggestion 242 based at least in part upon the detected pattern 308 for that location 241/212.

Location-based feedback 240 regarding selected FMS content 223 that satisfies the pre-determined criteria 307 may result in modification 309 of certain content while other content remains unchanged or is not modified. Further, certain users 215 in one location 212 may suggest a content change whereas users 215 in another location 212 do not or have not submitted feedback that satisfies the pre-determined criteria 307. Thus, as a result of the various feedback 240 received from users 215 at various locations 212, the FMS content 223 may be modified and adapted in different ways for users in different locations 212a, 212b, or FMS content 223 may be modified for one location but not another location since feedback from that other location has yet to satisfy the pre-determined criteria 307.

For example, as generally illustrated in FIGS. 10 and 11A-D, an example is illustrated in which embodiments were applied to analyze feedback 240 from three different locations 212a-c. Feedback 240 concerned segments 223S of two screens 601a and 601b: Screen 1/Segment 1; Screen 1/Segment 2; Screen 2/Segment 1 and Screen 2/Segment 2. A table or data structure 1000 with columns 1002a-e as illustrated in FIG. 10 may be utilized by the FMS 222 or content modifier 224 to track which screens/segments have been modified and which ones have not, and what those modifications are for different locations 212.

In the illustrated example, feedback 240 resulted in some, but not all, of the content 223 being modified for the three locations 212a-c. In the illustrated example, modifications 209 made for users 215 at Location 1 212a are the same as modifications 209 made for users 215 at Location 2 212b except that users at Location 2 212b will be presented with a different modification or version of Screen 2/Segment 1. In the illustrated example, modifications 309 made for users 215 at Location 3 212c are different than those made for users 215 at Locations 1 and 2 212a, 212b. For example, Screen 1/Segment 1 was modified to a first modification or version, which is the same modification made for users 215 at the other locations, but then different modifications for Screen 1/Segment 2, Screen 2/Segment 1 and Screen 2/Segment 2 were made for the third location 212c compared to the other locations 212a, 212b.

This is otherwise illustrated in FIGS. 11A-D, which illustrate tables 1100a-d including columns 1101a-e for the location (whether determined from the feedback location 241 data or other indication or data of location 212), the feedback count or output of the counter 303 for that location 212/241, the user count (if utilized) or output of a counter 303 that tracks how many users 215 have provided feedback 240, whether the pre-determined criteria 307 was satisfied, and the resulting modification 309 to the FMS content 223 that was the subject of the detected or identified feedback pattern 308. FIGS. 11A-D also illustrate examples of how certain feedback from Locations 1-3 satisfy or do not satisfy pre-determined criteria 307 and how that can be tracked according to embodiments.

Figure 12:
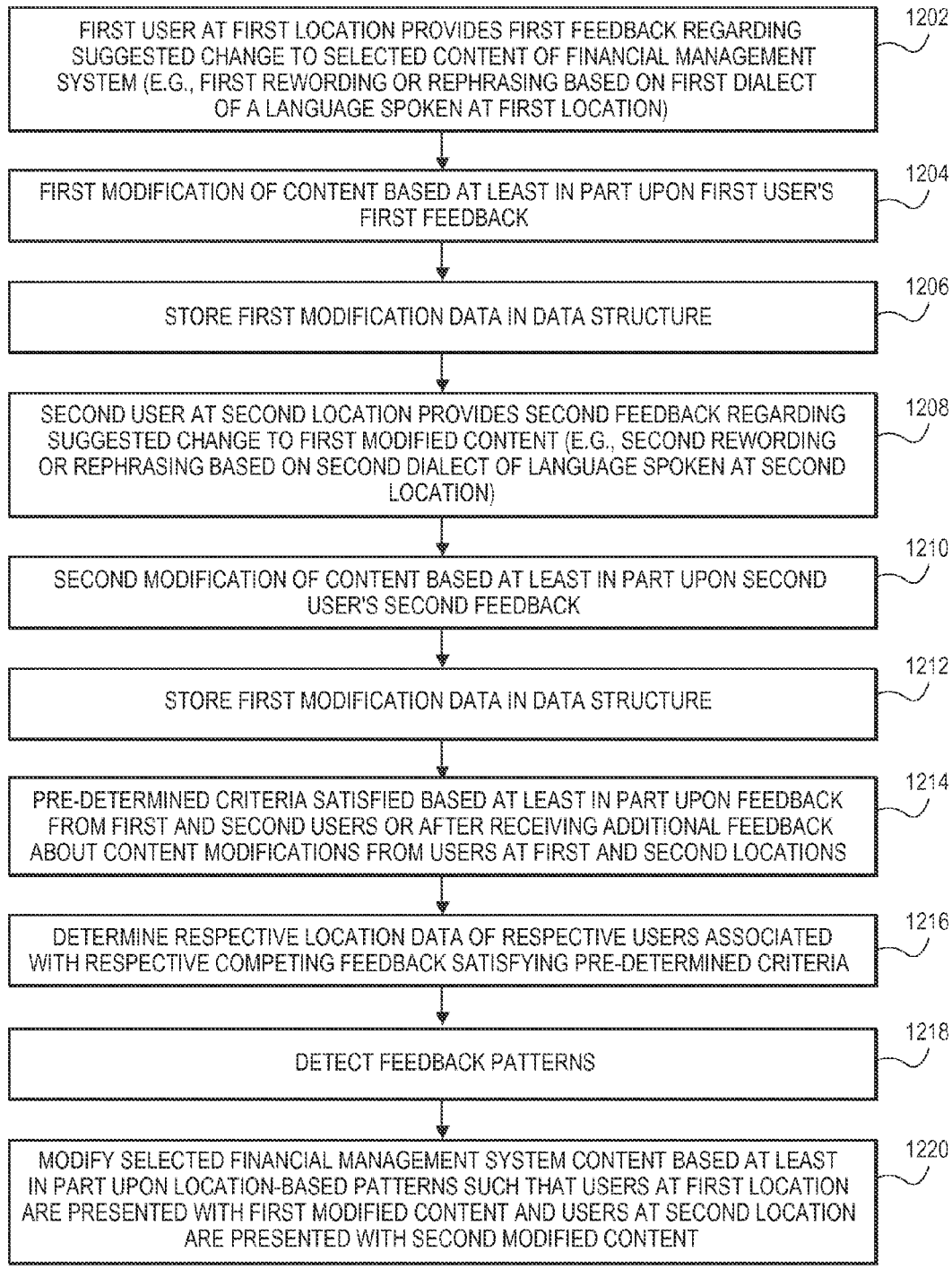
FIG. 12 is a flow diagram illustrating how embodiments may be implemented to modify financial management content as feedback is received and when pre-determined criteria has been satisfied, executing modifications for users at different locations to adapt the financial management system to language variations at the different locations.
Figure 13:
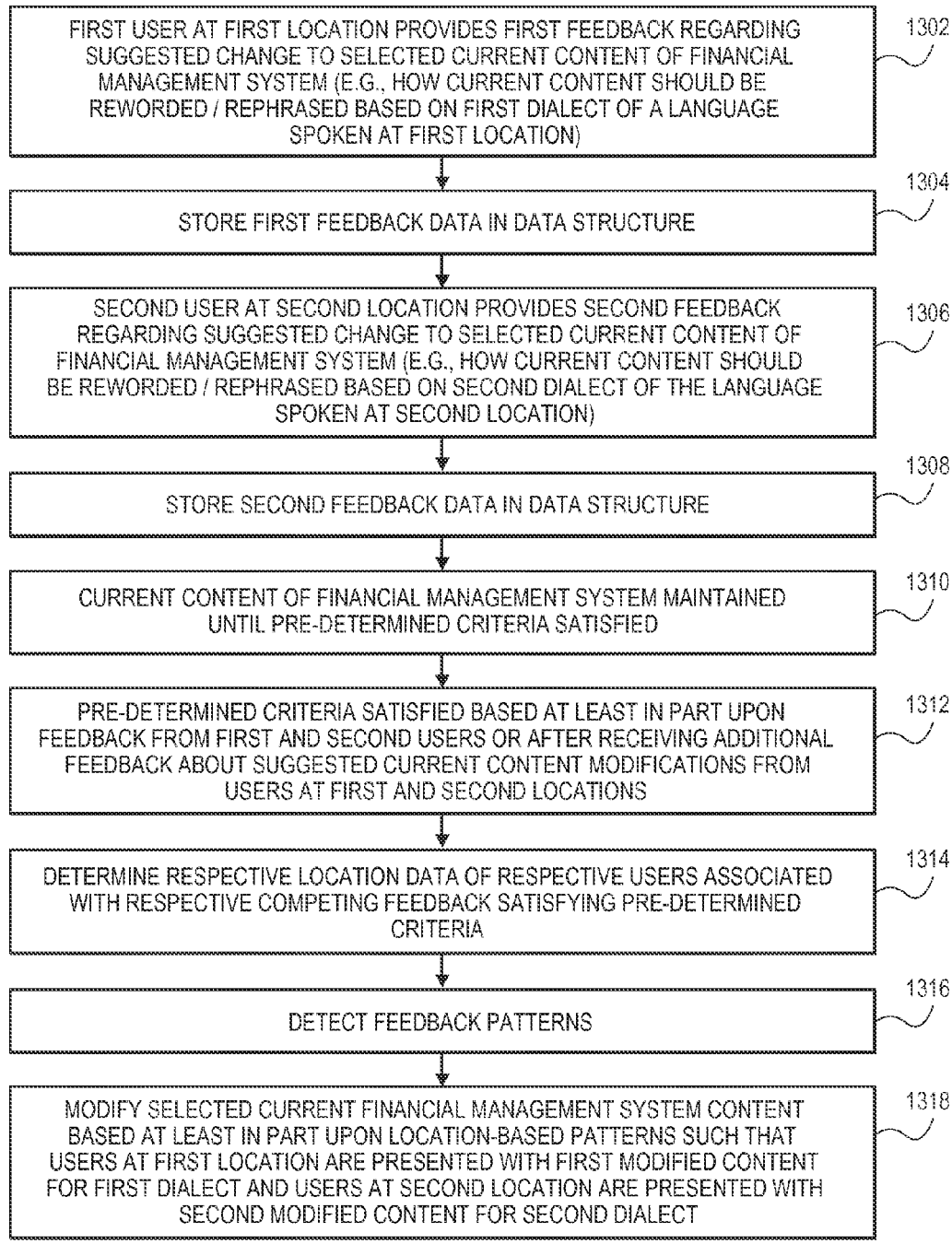
FIG. 13 is a flow diagram illustrating how embodiments may be implemented to store suggestions for modifying financial management content and when pre-determined criteria has been satisfied, executing modifications for users at different locations to adapt the financial management system to language variations at the different locations.

FIGS. 12 and 13 illustrate different ways embodiments may be implemented based on when FMS content 223 changes are made in response to individual feedback 240, and when FMS content 223 changes are made based on the analysis performed by the content modifier 224. According to one embodiment, FMS content 223 is modified each time feedback 240 is received such that FMS content 223 may be modified based on first feedback 240 from a first user 215 at a first location 212a, but then when another user 215 at a different location 212 views that first modification 309, that other user 215 may disagree with the first modified FMS content 233M and submit their own feedback 240 to change it back or modify it to something else. This back and forth competing feedback 240 with differing opinions by different users 215 at different locations 212 about how specific FMS content should be worded or phrased can continue until embodiments detect respective location-based feedback patterns 208, in response to which the FMS content 223 is modified in different ways for the users 215 at different locations 212.

For example, referring to FIG. 12, FMS content 223, e.g., original FMS content, is presented to users 215 at multiple locations 212, and at 1202, a first user 215a at a first location 212a provides first feedback 240a regarding how selected content of FMS 222 should be reworded or rephrased. According to one embodiment, the wording or phrasing proposed by the first user 215a is based at least in part upon a first dialect of a language spoken by the first user 215a at the first location 212a. In response, the FMS content 223 that was the subject of the first feedback 240a is modified at 1204, and at 1206, data of the first feedback 240a and modified FMS content 222M can be stored in the database 226 and a counter 303 associated with the first location 212a is incremented or updated.

Continuing with 1208, a different, second user 215b at a different, second location 212b utilizes the FMS 222 incorporating first modified content 223M-1 based on the first feedback 240a and provides second feedback 240b regarding how that first modified content 222M-1 should be reworded or rephrased. According to one embodiment, the wording or phrasing proposed by the second user 215b is based at least in part upon a second dialect of the same language spoken by the second user 215b at the second location 212b.

Thus, according to one embodiment, different users 215a, 215b may speak the same language, but different dialects or variations thereof. In this context, a dialect or variation is a variety of a language that is distinguished from other varieties based on one or more linguistic or speech attributes or features such as phonology, grammar, vocabulary, pronunciation and spelling, and thus often involve more subtle differences or nuances compared to two more substantial differences between two different languages. These dialects or varieties may be the result of various geographical, occupational and social factors.

For example, while English is a primary language spoken by users in the United States, there may be various regional or other location-based dialects that may result in certain users interpreting FMS content differently compared to other users in different regions such as a regional New England dialect, a regional southern dialect and a regional Hawaiian dialect. Thus, in this example, dialects may be spoken. As another example, while Spanish may be spoken by users in different countries of Spain and Argentina, users in Spain may speak Castellano Spanish whereas users in Argentina may speak Argentinian Spanish. As another example, Hindi is spoken in India, and people in different regions of India speak different dialects of Hindi. While certain embodiments are described with reference to adaptations to different dialects of Spanish and Hindi, it will be understood that embodiments are no so limited, and that adaptation may involve different countries and different regions or states of a country.

With continuing reference to FIG. 12, at 1210, a second modification 223M-2 of the FMS 222 is executed, and in this example, the first modified content 223M-1 is changed to the second modified content 223M-2 based at least in part upon second feedback 240b received from the second user 215b at the second location 212b. At 1212, data of the second feedback 240b and second modification 223M-2 can be stored in the database 226 and a counter 303 associated with the second location 212b incremented or updated.

At 1214, the pre-determined criteria 307 is satisfied based at least in part upon feedback 240a, 240b from first and second users 215a, 215b (e.g., if the pre-determined criteria 307 involves at least one competing working or phrasing of the same content), or after receiving additional feedback 240 and competing feedback about the same FMS content form users at the first and second, or other, locations. Thus, content modifications 223M may continue back and forth as users in different locations dispute or offer competing wordings, phrasing, interpretation or spelling of the FMS content that is the subject of the back and forth feedback 240.

At 1216, after pre-determined criteria 307 is satisfied, respective location data 241 of users 215 associated with respective feedback 240 and respective modification suggestions 242 in the form of suggested wordings, phrasings or spellings for respective dialects for respective locations 212a, 212b are determined, and from this data, patterns 308 within the location-based feedback are identified or extracted at 1218 by the analyzer 307. A pattern 308 may be identified based on all feedback suggestions 242 from a location matching or substantially matching or based on a majority of the feedback suggestions 242 for a particular location favoring a suggested content change or when a pre-determined or threshold percentage or number of the feedback responses favor a particular suggested content change. For example, a pattern 308 may be identified when 75% of the suggestions 242 from a location 212 suggest changing the same FMS content 223 in the same or substantially similar manner. At 1220, the selected FMS content 223 that was the subject of feedback 240 and for which a modification pattern 308 was identified is modified based at least in part upon the pattern 308 such that users 215 at the first location 212a are presented with first modified content 223M-1 for first dialect and users 215 at the second location 212b are presented with second modified content 223M-1 for second dialect. This may involve different dialects of a language spoken by users in different countries or in different locations of different regions of the same country or state.

Referring to FIG. 13, in another embodiment, FMS content 223 is not immediately changed as feedback 240 is received from different users 215, but instead, is aggregated or collected while maintaining an original or current FMS content 223 and changing the FMS content 223 only after the pre-determined criteria 307 has been satisfied. Thus, while the embodiment shown in FIG. 12 may involve back and forth disagreements between users 215 in different locations 212 and FMS modifications 309 made as different suggestions are received until the FMS modifications 309 are made to adapt to each location 212, the embodiment shown in FIG. 13 delays modifying FMS content 223 until pre-determined criteria 307 is satisfied.

At 1302, a first user 215a at first location 212a provides first feedback 240a regarding suggested change to selected current content of the FMS 223 (e.g., how current FMS content 223 should be reworded/rephrased based on first dialect of a language spoken at first location 212a), and at 1304, the first feedback data 240a is stored in the database 226. At 1306, a second user 215b at a different, second location 212b provides second feedback 240b regarding suggested change to the selected current FMS content 223 that was also presented to the first user 215a (e.g., how current content 223 should be reworded/rephrased based on second dialect of the language spoken at second location 212b), and at 1308, the second feedback 240b data is stored in the database 226. Thus, at 1310, the original or current FMS content 223 that was the subject of the first and second feedback 240a, 240b remains unmodified until the pre-determined criteria 307 satisfied.

At 1312, the pre-determined criteria 307 is satisfied based at least in part upon feedback 240a, 240b from first and second users 215a, 215b or after receiving additional feedback about suggested current content modifications from users at first and second locations 212a, 212b. At 1314, respective location data 241a, 241b of respective users 215a, 215b associated with respective competing feedback 240a, 240b satisfying pre-determined criteria 307 is determined, and feedback patterns 308a, 308b are detected at 1316. As a result, at 1318, the selected FMS content 223 is modified based at least in part upon location-based patterns 308a-308b such that users 215 at the first location 212a are presented with first modified content 223M-1 for first dialect and users at second location 212b are presented with second modified content 223M-2 for second dialect.

Thus, with embodiments, FMS content 223 may be adapted to dialects spoken by different users 215 in different countries or regions thereof, whether the FMS content 223 is changed as feedback 240 received and then later adapted to different locations 212a, 212b when pre-determined criteria 307 is satisfied, or FMS content 223 modifications are delayed until pre-determined criteria 307 is satisfied.

Figure 14:
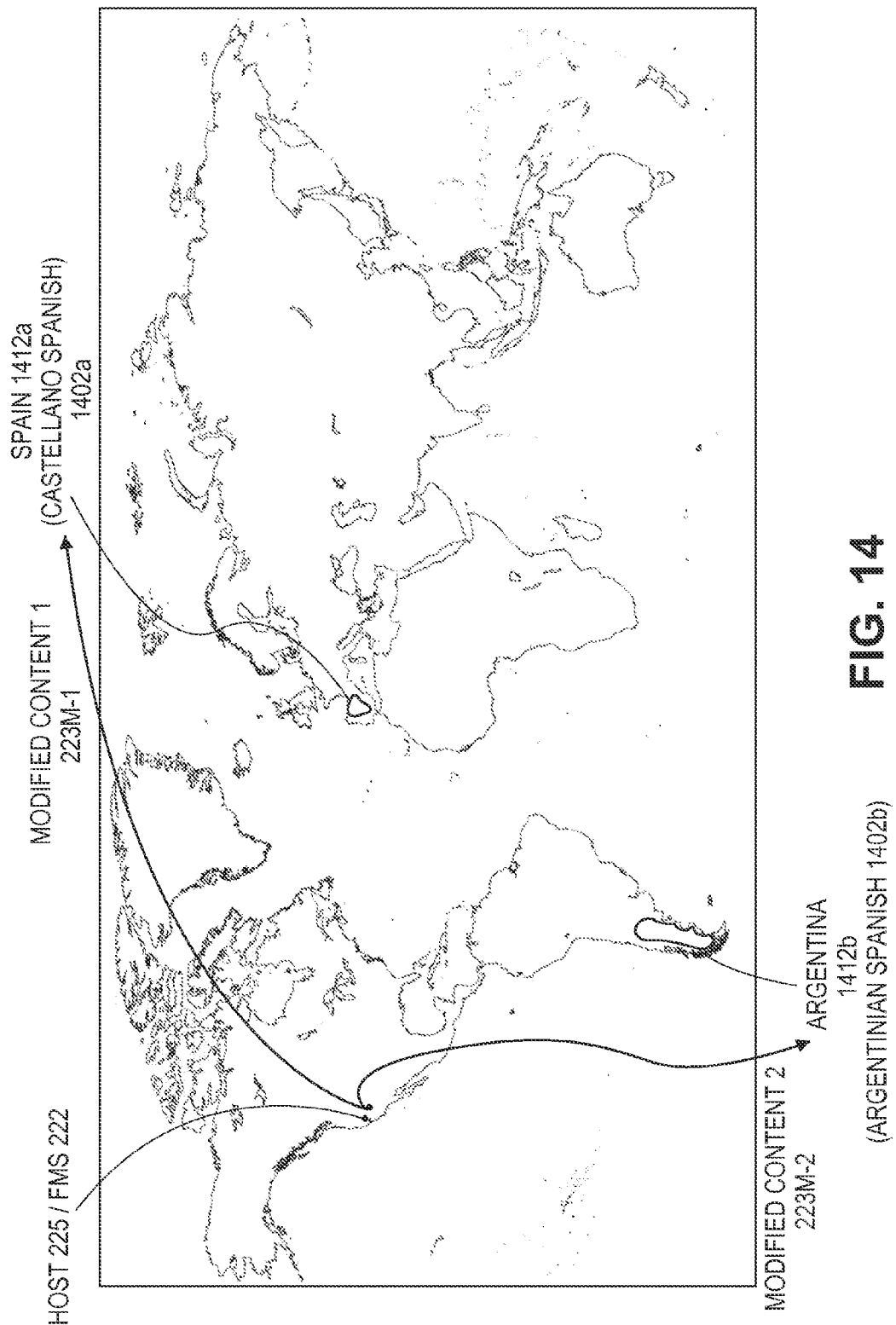
FIG. 14 illustrates one example in which financial management system content is adapted for different users in different countries that speak different dialects of the same language.

As an example, referring to FIG. 14, embodiments may be utilized to receive feedback from users that speak Spanish 1400 and are located in Spain 1412a and Argentina 1412b, but FMS content 223, which may be in the Spanish language initially, can be modified and adapted to different dialects 1402: Castellano Spanish 1402a for users in Spain 1412a and Argentinian Spanish 1412b for users in Argentina 1412b. Thus, embodiments are able to leverage crowdsourced FMS feedback 240 while improving upon traditional crowdsourced translation results by geotagging feedback 240 and identifying feedback patterns 208 within tagged feedback 240, to capture more subtle language variations such as different dialects 1402, thus providing for a more comprehensive and accurate presentation of FMS content 223 that is consistent with different languages and dialects 1402 spoken by users 215 at different locations 212.

Figure 15:
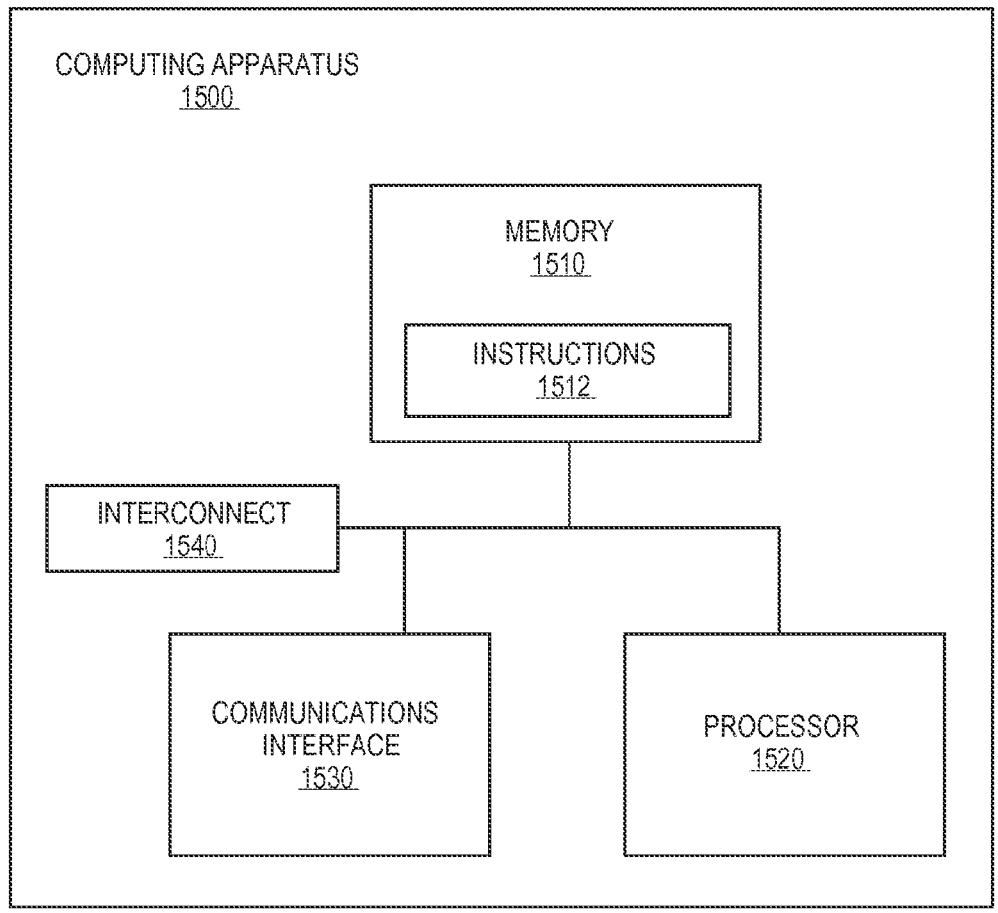
FIG. 15 is a block diagram of components of a computing apparatus or system in which various embodiments may be implemented or that may be utilized to execute various embodiments.

FIG. 15 generally illustrates components of a computing device 1500 that may be utilized to execute embodiments and that includes a memory 1510, account processing program instructions 1512, a processor or controller 1520 to execute account processing program instructions 1512, a network or communications interface 1530, e.g., for communications with a network or interconnect 1540 between such components. The memory 1510 may be or include one or more of cache, RAM, ROM, SRAM, DRAM, RDRAM, EEPROM and other types of volatile or non-volatile memory capable of storing data. The processor unit 1520 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1540 may include a system bus, LDT, PCI, ISA, or other types of buses, and the communications or network interface may, for example, be an Ethernet interface, a Frame Relay interface, or other interface. The network interface 1530 may be configured to enable a system component to communicate with other system components across a network which may be a wireless or various other networks. It should be noted that one or more components of computing device 1500 may be located remotely and accessed via a network. Accordingly, the system configuration provided in FIG. 15 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1520 performs steps or executes program instructions 1512 within memory 1510 and/or embodied on the carrier to implement method embodiments. Further, embodiments may reside and execute on a mobile communication device such as a cellular telephone or Smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Moreover, while embodiments are described with reference to a FMS, embodiments may be a part of or used to modify content of various financial management systems utilized by users at different locations having different linguistic attributes such as QUICKBOOKS, QUICKBOOKS UN (international version), MINT, QUICKEN, FINANCEWORKS financial management systems, Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method for location-based adaptation of financial management system content, the method being performed by an intermediate computer hosting a financial management system accessed by different users at different locations, the method comprising:

the intermediate computer receiving feedback from feedback providing users of the financial management system that are at a first location and receiving feedback from feedback providing users of the financial management system that are at a second location different from the first location, wherein the first location and the second location are different locations of different countries, regions, states, areas or neighborhoods thereof associated with distinguishable linguistic attributes, variations or dialects, the received feedback from feedback providing users at the first location suggesting how users at the first location would modify a first segment of content of a screen generated by the financial management system displayed to and selected by the feedback providing users at the first location, the received feedback received from feedback providing users at the second location suggesting how the feedback providing users at the second location would modify a second segment of content of the screen generated by the financial management system displayed to and selected by the feedback providing users at the second location;

the intermediate computer determining whether the received feedback received from the feedback providing users at the first location and feedback received from feedback providing users at the second location satisfy pre-determined criteria, wherein the pre-determined criteria is a pre-determined minimum or threshold count of a number of times a location-based feedback has been received for a respective location; and when the feedback received from feedback providing users at the first location and feedback received from feedback providing users at the second location satisfy the pre-determined criteria is satisfied, the intermediate computer determining respective first location data and second location data associated with respective feedback received from users at respective first and second locations, automatically modifying the screen generated by the financial management system such that a first modified screen including first modified content is presented to the feedback providing users and other users at a first location associated with the first location data, and automatically modifying content of the screen generated by the financial management system such that a second modified screen including second modified content is presented to the feedback providing user and other users at the second location associated with the second location data, else when neither the feedback received from feedback providing users at the first location nor the feedback received from feedback providing users at the second location satisfies the pre-determined criteria, the financial management system screen is not modified, wherein individual feedback providing users of the financial management system may suggest respective modifications to financial management system content but are not able to modify financial management system content.

2. The computer-implemented method of claim 1, when the pre-determined criteria is not satisfied, the intermediate computer presenting current financial management system content to all users at the first and second locations until the pre-determined criteria is satisfied and the current content is modified.

3. The computer-implemented method of claim 2, the current financial management system content being previously unmodified financial management system content.

4. The computer-implemented method of claim 2, the current financial management system content is content that was modified at least once before based at least in part upon previously received feedback and not modified again until the pre-determined criteria is satisfied.

5. The computer-implemented method of claim 1, when the pre-determined criteria is not satisfied, the method further comprising the intermediate computer:

receiving additional feedback from respective feedback providing users at respective first and second locations until the pre-determined criteria is satisfied, and automatically modifying the screen generated by the financial management system such that the first modified screen including the first modified content is presented to the feedback providing users and other users at the first location associated with the first location data, and, and automatically modifying content of the screen generated by the financial management system such that a second modified screen including second modified content is presented to the feedback providing user and other users at the second location associated with the second location data.

6. The computer-implemented method of claim 1, the pre-determined criteria comprising:

a first pre-determined minimum number of feedback providing users at the first location that provided feedback suggesting how the presented screen content selected by the feedback providing users at the first location should be modified, and a second pre-determined minimum number of feedback providing users at the second location that provided feedback suggesting how the presented screen content selected by the feedback providing users at the second location should be modified.

7. The computer-implemented method of claim 6, wherein the first pre-determined minimum number is the same as the second pre-determined minimum number.

8. The computer-implemented method of claim 6, wherein the first pre-determined minimum number is different from the second pre-determined minimum number.

9. The computer-implemented method of claim 1, the pre-determined criteria comprising a first pre-determined minimum number of times feedback has been received from feedback providing users at the first location, and a second pre-determined minimum number of times feedback has been received from feedback providing users at the second location.

10. The computer-implemented method of claim 1, the pre-determined criteria comprising:

a first pre-determined minimum percentage of feedback providing users at the first location that provided feedback suggesting how the presented screen content selected by feedback providing users at the first location should be modified, and a second pre-determined minimum percentage of feedback providing users at the second location that provided feedback suggesting how the presented screen content selected by feedback providing users at the second location should be modified.

11. The computer-implemented method of claim 1, the selected screen content comprising a word or phrase of a screen generated by the financial management system and selected by feedback providing users of the financial management system.

12. The computer-implemented method of claim 11, the received feedback indicating different ways feedback providing users at the different first and second locations would reword the word or phrase selected by respective feedback providing users at respective first and second locations.

13. The computer-implemented method of claim 1, the first modified content being based at least in part upon a first language spoken at the first location and the second modified content being based at least in part upon a second language spoken at the second location, wherein the screen generated by the financial management system including the first modified content is presented in the first language to the feedback providing users and other users at the first location, and the screen generated by the financial management system including the second modified content is presented in the second language to the feedback providing users and other users at the second location.

14. The computer-implemented method of claim 1, the first modified content being based at least in part upon a first dialect of a language spoken at the first location and the second modified content being based at least in part upon a second dialect of the language spoken at the second location, wherein the screen generated by the financial management system including the first modified content is presented in the first dialect to the feedback providing users and other users at the first location, and the screen generated by the financial management system including the second modified content is presented in the second dialect to the feedback providing users and other users at the second location.

15. The computer-implemented method of claim 1, the first location being a first country and the second location being a second country different from the first country, wherein the same language but different first and second dialects of the same language are spoken by respective users in respective first and second countries, wherein the screen generated by the financial management system including the first modified content is presented in the first dialect to the feedback providing users and other users in the first country and the screen generated by the financial management system including the second modified content is presented in the second dialect to the feedback providing users and other users in the second country.

16. The computer-implemented method of claim 1, wherein the first location is a pre-determined first region of a country and the second location is a pre-determined second region of the country, wherein the same language but different first and second dialects are spoken by respective users from respective first and second regions of the same country, wherein the screen generated by the financial management system including the first modified content is presented in the first dialect to the feedback providing users and other users in the first region and the screen generated by the financial management system including the second modified content is presented in the second dialect to the feedback providing users and other users in the second region.

17. The computer-implemented method of claim 1, further comprising the intermediate computer:
transmitting a first update to respective desktop versions of the financial management system executing on respective computing devices of respective feedback providing users and other users at the first location, the first update incorporating the first modified content; and
transmitting a second update to respective desktop versions of the financial management system executing on respective computing devices of respective feedback providing users and other users at the second location, the second update incorporating the second modified content.

18. The computer-implemented method of claim 1, the intermediate computer executing respective first and second counters associated with respective first and second locations, wherein determining whether the received feedback satisfies pre-determined criteria is based at least in part upon respective counts of respective counters indicating how many times feedback associated with respective locations has been received.

19. The computer-implemented method of claim 1, wherein content of the screen generated by the financial management system other than the first modified content remains unchanged and is presented to respective feedback providing users and other users at the first location together with the first modified content.

20. The computer-implemented method of claim 1, the first and second feedback being related to the same word or phrase displayed within the same screen generated by the financial management system and selected by respective feedback providing users at different first and second locations.

21. The computer-implemented method of claim 1, the intermediate computer being accessed by respective computers of respective feedback providing users at respective different first and second locations through respective networks.

22. The computer-implemented method of claim 1, the intermediate computer determining respective location data based at least in part upon an Internet Protocol (IP) address of a computing apparatus of a feedback providing user utilized to access the financial management system.

23. The computer-implemented method of claim 1, the intermediate computer determining respective location data based at least in part upon geographic location data provided by a feedback providing user of the financial management system.

24. The computer-implemented method of claim 1, the financial management system content being modified based at least in part upon the intermediate computer detecting respective first and second feedback patterns resulting from multiple feedback providing users at a location suggesting that content of a screen of the financial management system selected by the multiple feedback providing users be modified in the same or substantially similar manner.

25. The computer-implemented method of claim 1, wherein the screen generated by the financial management system is automatically modified by a plug-in to the financial management system.

26. The computer-implemented method of claim 1, wherein the feedback from users at the first location suggesting how the first segment of content of the screen generated by the financial management system would be modified does not result in modification of the first segment, and the feedback from users at the second location suggesting how the second segment of content of the screen generated by the financial management system would be modified does not result in modification of the second segment.

27. A computer-implemented method for location-based adaptation of financial management system content, the method being performed by an intermediate computer hosting a financial management system accessed by different users at different first and second locations, the method comprising:
the intermediate computer receiving feedback from feedback providing users at the first location and receiving feedback from feedback providing users at the second location, the received feedback from feedback providing users at the first location suggesting how feedback providing users at the first location would modify a first segment of content of a screen generated by the financial management system displayed to and selected by the feedback providing users at the first location, the received feedback from feedback providing users at the second location suggesting how feedback providing users at the second location would modify a second segment of content of the screen generated by the financial management system displayed to and selected by the feedback providing users at the second location, wherein the first location and the second location are different locations of different countries, regions, states, areas or neighborhoods thereof associated with distinguishable linguistic attributes, variations or dialects;
the intermediate computer tagging respective received feedback with respective location data;
the intermediate computer determining whether the received feedback satisfies pre-determined criteria, wherein the pre-determined criteria is a pre-determined minimum or threshold count of users providing similar feedbacks from a respective location; and
when the feedback received from respective feedback providing users at respective first and second locations satisfies the pre-determined criteria, the intermediate computer determining respective location data of respective feedback providing users associated with respective tagged feedback, detecting a first feedback pattern resulting from multiple feedback providing users at the first location suggesting that content of the financial management system be modified in the same or substantially similar manner, detecting a second feedback pattern resulting from multiple feedback providing users at the second location suggesting that content of the financial management system be modified in the same or substantially similar manner, and automatically modifying the screen generated by the financial management system such that a first modified screen including first modified content based at least in part upon the first pattern is presented to feedback providing users and other users at the first location based at least in part upon the first feedback pattern, and second modified screen including the second modified content is presented to the feedback providing users and other users at the second location based at least in part upon the second feedback pattern, else when neither the feedback received from feedback providing users at the first location nor the feedback received from feedback providing users at the second location satisfies the pre-determined criteria, the financial management system screen is not modified, wherein individual feedback providing users of the financial management system may suggest respective modifications to financial management system content but are not able to modify financial management system content.

28. The computer-implemented method of claim 27, wherein tagging respective feedback comprising the intermediate computer tagging received feedback with an Internet Protocol (IP) address of a computing apparatus of a feedback providing user utilized to access the financial management system.

29. The computer-implemented method of claim 27, wherein tagging respective feedback comprising the intermediate computer tagging received feedback with geographic location data provided by a feedback providing user of the financial management system.

30. A computer-implemented method for location-based adaptation of financial management system content, the method being performed by an intermediate computer hosting a financial management system, the method comprising:

the intermediate computer receiving crowdsourced feedback volunteered by feedback providing end users of the financial management system that are at a first location and by feedback providing end users of the financial management system that are at a second location different from the first location, wherein the first location and the second location are different locations of different countries, regions, states, areas or neighborhoods thereof associated with distinguishable linguistic attributes, variations or dialects, the received crowdsourced feedback from feedback providing end users at the first location suggesting how the feedback providing end users at the first location would modify a first segment of content of a screen generated by the financial management system displayed to and selected by the feedback providing end users at the first location, the received crowdsourced feedback from feedback providing end users at the second location suggesting how the feedback providing end users at the second location would modify a second segment of content of the screen generated by the financial management system displayed to and selected by the feedback providing end users at the second location;

the intermediate computer tagging respective crowdsourced feedback with respective location data comprising at least one of an Internet Protocol (IP) address of a computing apparatus of a feedback providing end user from which the crowdsourced feedback was received and geographic location data of the feedback providing end user;

the intermediate computer determining whether tagged feedback satisfies pre-determined feedback count criteria, wherein the pre-determined criteria is a pre-determined minimum or threshold count of users providing similar feedbacks from a respective location; and when the pre-determined feedback count criteria is satisfied, the intermediate computer determining respective location data of respective feedback providing end users associated with respective tagged feedback, and identifying respective first and second feedback patterns associated with respective location data; and automatically modifying the content of the financial management system based at least in part upon respective identified respective feedback patterns such that first modified content based at least in part upon a first identified pattern is presented to feedback providing end users and other end users at the first location that speak a first dialect of a language, and second modified content based at least in part upon a second identified pattern is presented to feedback providing end users and other users at the second location and that speak a second dialect of the language different from the first dialect, else when the pre-determined feedback count criteria is not satisfied, the financial management system screen is not modified, wherein individual feedback providing users of the financial management system may suggest respective modifications to financial management system content but are not able to modify financial management system content.

31. A computer program product comprising a non-transitory computer readable storage medium embodying one or more instructions executable by an intermediate computer hosting a financial management system accessed by different users at different locations to perform a process for location-based adaptation of financial management system content, the process comprising:

receiving feedback from feedback providing users of the financial management system that are at a first location and receiving feedback from feedback providing users of the financial management system that are at a second location different from the first location, the received feedback from feedback providing users at the first location suggesting how users at the first location would modify a first segment of content of a screen generated by the financial management system displayed to and selected by the feedback providing users at the first location, the received feedback received from feedback providing users at the second location suggesting how the feedback providing users at the second location would modify a second segment of content of the screen generated by the financial management system displayed to and selected by the feedback providing users at the second location, wherein the first location and the second location are different locations of different countries, regions, states, areas or neighborhoods thereof associated with distinguishable linguistic attributes, variations or dialects;

determining whether the received feedback received from the feedback providing users at the first location and feedback received from feedback providing users at the second location satisfy pre-determined criteria, wherein the pre-determined criteria is a pre-determined minimum or threshold count of users providing similar feedbacks from a respective location; and when the feedback received from feedback providing users at the first location and feedback received from feedback providing users at the second location satisfy the pre-determined criteria is satisfied, determining respective first location data and second location data associated with respective feedback received from users at respective first and second locations, automatically modifying the screen generated by the financial management system such that a first modified screen including first modified content is presented to the feedback providing users and other users at a first location associated with the first location data, and automatically modifying content of the screen generated by the financial management system such that a second modified screen including second modified content is presented to the feedback providing user and other users at the second location associated with the second location data, else when neither the feedback received from feedback providing users at the first location nor the feedback received from feedback providing users at the second location satisfies the pre-determined criteria, the financial management system screen is not modified, wherein individual feedback providing users of the financial management system may suggest respective modifications to financial management system content but are not able to modify financial management system content.

32. A computer program product comprising a non-transitory computer readable storage medium embodying one or more instructions executable by an intermediate computer hosting a financial management system accessed by different users at different locations to perform a process for location-based adaptation of financial management system content, the process comprising:

receiving feedback from feedback providing users at the first location and receiving feedback from feedback providing users at the second location, the received feedback from feedback providing users at the first location suggesting how feedback providing users at the first location would modify a first segment of content of a screen generated by the financial management system displayed to and selected by the feedback providing users at the first location, the received feedback from feedback providing users at the second location suggesting how feedback providing users at the second location would modify a second segment of content of the screen generated by the financial management system displayed to and selected by the feedback providing users at the second location, wherein the first location and the second location are different locations of different countries, regions, states, areas or neighborhoods thereof associated with distinguishable linguistic attributes, variations or dialects;

tagging respective received feedback with respective location data;

determining whether the received feedback satisfies pre-determined criteria, wherein the pre-determined criteria is a pre-determined minimum or threshold count of users providing similar feedbacks from a respective location; and when the feedback received from respective feedback providing users at respective first and second locations satisfies the pre-determined criteria,
  determining respective location data of respective feedback providing users associated with respective tagged feedback,
  detecting a first feedback pattern resulting from multiple feedback providing users at the first location suggesting that content of the financial management system be modified in the same or substantially similar manner,
  detecting a second feedback pattern resulting from multiple feedback providing users at the second location suggesting that content of the financial management system be modified in the same or substantially similar manner, and
  automatically modifying the screen generated by the financial management system such that a first modified screen including first modified content based at least in part upon the first pattern is presented to feedback providing users and other users at the first location based at least in part upon the first feedback pattern, and second modified screen including the second modified content is presented to the feedback providing users and other users at the second location based at least in part upon the second feedback pattern,
else when neither the feedback received from feedback providing users at the first location nor the feedback received from feedback providing users at the second location satisfies the pre-determined criteria, the financial management system screen is not modified,
wherein individual feedback providing users of the financial management system may suggest respective modifications to financial management system content but are not able to modify financial management system content.

33. A computer program product comprising a non-transitory computer readable storage medium embodying one or more instructions executable by an intermediate computer hosting a financial management system accessed by different users at different locations to perform a process for location-based adaptation of financial management system content, the process comprising:

receiving crowdsourced feedback volunteered by feedback providing end users of the financial management system that are at a first location and by feedback providing end users of the financial management system that are at a second location different from the first location, the received crowdsourced feedback from feedback providing end users at the first location suggesting how the feedback providing end users at the first location would modify a first segment of content of a screen generated by the financial management system displayed to and selected by the feedback providing end users at the first location, the received crowdsourced feedback from feedback providing end users at the second location suggesting how the feedback providing end users at the second location would modify a second segment of content of the screen generated by the financial management system displayed to and selected by the feedback providing end users at the second location, wherein the first location and the second location are different locations of different countries, regions, states, areas or neighborhoods thereof associated with distinguishable linguistic attributes, variations or dialects;

the intermediate computer tagging respective crowdsourced feedback with respective location data comprising at least one of an Internet Protocol (IP) address of a computing apparatus of a feedback providing end user from which the crowdsourced feedback was received and geographic location data of the feedback providing end user;

the intermediate computer determining whether tagged feedback satisfies pre-determined feedback count criteria, wherein the pre-determined criteria is a pre-determined minimum or threshold count of users providing similar feedbacks from a respective location; and when the pre-determined feedback count criteria is satisfied, the intermediate computer determining respective location data of respective feedback providing end users associated with respective tagged feedback, and identifying respective first and second feedback patterns associated with respective location data; and automatically modifying the content of the financial management system based at least in part upon respective identified respective feedback patterns such that first modified content based at least in part upon a first identified pattern is presented to feedback providing end users and other end users at the first location that speak a first dialect of a language, and second modified content based at least in part upon a second identified pattern is presented to feedback providing end users and other users at the second location and that speak a second dialect of the language different from the first dialect, else when the pre-determined feedback count criteria is not satisfied, the financial management system screen is not modified, wherein individual feedback providing users of the financial management system may suggest respective modifications to financial management system content but are not able to modify financial management system content.

* * * * *